US008065175B1

(12) United States Patent
Lewis

(10) Patent No.: US 8,065,175 B1
(45) Date of Patent: Nov. 22, 2011

(54) SYSTEM AND METHOD FOR RELATIONAL SCHEDULING OF PEOPLE AND/OR RESOURCES

(75) Inventor: Sean P. Lewis, Dublin, CA (US)

(73) Assignee: Intuit Inc., Mountain View, CA (US)

( * ) Notice: Subject to any disclaimer, the term of this patent is extended or adjusted under 35 U.S.C. 154(b) by 1332 days.

(21) Appl. No.: 11/668,644

(22) Filed: Jan. 30, 2007

(51) Int. Cl.
G06Q 10/00 (2006.01)
(52) U.S. Cl. .................. 705/7.19; 705/7.16; 705/7.17; 705/7.18; 715/751; 707/706; 709/204
(58) Field of Classification Search .................. 715/751; 707/706; 709/204
See application file for complete search history.

(56) References Cited

U.S. PATENT DOCUMENTS

| | | | | | |
|---|---|---|---|---|---|
| 4,626,836 | A | * | 12/1986 | Curtis et al. ................... | 345/156 |
| 4,817,018 | A | * | 3/1989 | Cree et al. ..................... | 715/751 |
| 4,831,552 | A | * | 5/1989 | Scully et al. ................... | 715/751 |
| 5,050,077 | A | * | 9/1991 | Vincent ............................. | 705/8 |
| 5,070,470 | A | * | 12/1991 | Scully et al. ................... | 708/112 |
| 5,124,912 | A | * | 6/1992 | Hotaling et al. ................. | 705/9 |
| 5,270,920 | A | * | 12/1993 | Pearse et al. ..................... | 705/8 |
| 5,303,145 | A | * | 4/1994 | Griffin et al. ...................... | 705/9 |
| 5,619,695 | A | * | 4/1997 | Arbabi et al. ................. | 718/100 |
| 5,933,810 | A | * | 8/1999 | Okawa ............................... | 705/5 |
| 5,963,913 | A | * | 10/1999 | Henneuse et al. ................ | 705/9 |
| 7,027,995 | B2 | * | 4/2006 | Kaufman et al. .................. | 705/8 |
| 7,082,402 | B2 | * | 7/2006 | Conmy et al. ..................... | 705/8 |
| 7,188,073 | B1 | * | 3/2007 | Tam et al. .......................... | 705/9 |
| 7,283,970 | B2 | * | 10/2007 | Cragun et al. ..................... | 705/8 |
| 7,299,193 | B2 | * | 11/2007 | Cragun et al. ..................... | 705/9 |
| 7,343,312 | B2 | * | 3/2008 | Capek et al. ....................... | 705/8 |
| 7,343,313 | B2 | * | 3/2008 | Dorenbosch et al. ............. | 705/8 |
| 7,627,629 | B1 | * | 12/2009 | Wu et al. ........................ | 709/204 |
| 7,693,734 | B2 | * | 4/2010 | Christenson et al. ............. | 705/8 |
| 7,693,736 | B1 | * | 4/2010 | Chu et al. ..................... | 705/7.19 |
| 7,707,256 | B2 | * | 4/2010 | Rollin et al. .................. | 709/206 |
| 7,818,198 | B2 | * | 10/2010 | Masselle et al. .................. | 705/9 |
| 7,865,387 | B2 | * | 1/2011 | Mansour ........................... | 705/9 |
| 2001/0014866 | A1 | * | 8/2001 | Conmy et al. ..................... | 705/9 |
| 2002/0016729 | A1 | * | 2/2002 | Breitenbach et al. ............. | 705/9 |
| 2002/0184063 | A1 | * | 12/2002 | Kaufman et al. .................. | 705/7 |
| 2002/0191035 | A1 | * | 12/2002 | Selent ........................... | 345/866 |
| 2003/0065544 | A1 | * | 4/2003 | Elzinga et al. .................... | 705/8 |

(Continued)

OTHER PUBLICATIONS

"Windows Client User Guide" (Novell Groupwise 7.0, Mar. 14, 2008, copyright 2005-2008).*
"Special Edition Using Lotus Notes and Domino 5" (Published by Que, Aug. 23, 1999, ISBN 0-7897-1814-6).*

(Continued)

Primary Examiner — Lynda Jasmin
Assistant Examiner — Alan S Miller
(74) Attorney, Agent, or Firm — Gunnison, McKay & Hodgson, L.L.P.; Philip McKay

(57) ABSTRACT

A system and method for relational scheduling of people and/or resources includes a process for relational scheduling of people and/or resources whereby a user desiring to schedule a meeting is provided the ability to designate participants and/or meeting resources desired for a meeting, and to give each desired participant and/or meeting resource an importance rating/score, including the ability to designate a given participant and/or meeting resource as mandatory. The user also defines meeting scheduling criteria including a meeting length and a meeting date window. This meeting request data is then used to search participant and/or meeting resource availability data to determine one or more meeting times within the user defined meeting scheduling criteria provide not only the mandatory meeting requirements, but also maximize the non-mandatory participant and/or resource rating/score for the meeting.

7 Claims, 12 Drawing Sheets

U.S. PATENT DOCUMENTS

| | | | |
|---|---|---|---|
| 2003/0149605 A1* | 8/2003 | Cragun et al. | 705/8 |
| 2003/0149606 A1* | 8/2003 | Cragun et al. | 705/8 |
| 2003/0204474 A1* | 10/2003 | Capek et al. | 705/64 |
| 2004/0064355 A1* | 4/2004 | Dorenbosch et al. | 705/9 |
| 2005/0197877 A1* | 9/2005 | Kalinoski | 705/8 |
| 2006/0062367 A1* | 3/2006 | Christenson et al. | 379/202.01 |
| 2006/0167731 A1* | 7/2006 | Nishimura et al. | 705/8 |
| 2006/0200374 A1* | 9/2006 | Nelken | 705/9 |
| 2007/0021997 A1* | 1/2007 | Hayes, et al. | 705/9 |
| 2007/0162315 A1* | 7/2007 | Hodges | 705/8 |
| 2007/0239506 A1* | 10/2007 | Jania et al. | 705/8 |
| 2009/0055234 A1* | 2/2009 | Li et al. | 705/8 |
| 2009/0177503 A1* | 7/2009 | Kawano et al. | 705/5 |

OTHER PUBLICATIONS

"A contracting model for flexible distributed scheduling" Sandip Sen; Edmund H. Durfree; Annals of Operations Research 65(1996)195-222.*

"Adaptive meeting scheduling for large-scale distributed groupware" F. Wang; BT Technology Journal, vol. 21 No. 4, Oct. 2003.*

"A conceptual mode of an interorganizational intelligent meeting-scheduler (IIMS)" Chanan Glezer; Journal of Strategic Information Systems 12 (2003) 47-70.*

"A formal study of Distributed Meeting Scheduling"; Sandip Sen; Edmund H. Durfree; Group Decision and Negotiation 7: 265-289, 1998 Kluwer Academic Publishers.*

* cited by examiner

ROOM/FACILITY DATA ENTRY FORM

ROOM [ 101 ] ▽
          301

MAXIMUM SEATING  [ 25 ]
                 303

INCLUDED EQUIPMENT/CAPABILITIES  305

| ITEM | | NUMBER |
|---|---|---|
| [x] | VIDEO CONFERENCE | [ 1 ] |
| [x] | AUDIO CONFERENCE | [ 1 ] |
| [x] | WHITE/BLACK BOARD | [ 2 ] |
| [x] | OVERHEAD PROJECTOR | [ 1 ] |
| [ ] | AUDIO PLAYER | [  ] |
| [x] | VIDEO PLAYER | [ 1 ] |
| [x] | AUDIO RECORDER | [ 1 ] |
| [x] | VIDEO RECORDER | [ 1 ] |
| [x] | OTHER Computer/Internet | [ 2 ] |

MOBILE EQUIPMENT DATA ENTRY FORM

400

ITEM NAME [Handheld Video Recorder ▽]  401

ITEM DESCRIPTION

Sony DVD recorder MODEL S103B1. Hand or tri-pod mounted unit that records 30 minutes of video and audio per mini DVD. Includes auto focus and zoom. Requires 1 Mini DVD per 30 minutes of recording.

MEETING REQUEST

DATE WINDOW

| 1/31/07 | TO | 2/27/07 |   501

DAYS OF THE WEEK

| MONDAY TO FRIDAY ONLY ▽ |   503

TIME WINDOW

| 8AM | TO | 5PM |   505

LENGTH OF MEETING

| 90 | MIN ▽ |   507

NUMBER OF ATTENDEES

MIN | 5 |  MAX | 10 |   509

EQUIPMENT/CAPABILITIES DESIRED   511

| ITEM | IMPORTANCE | MANDATORY |
|---|---|---|
| [x] VIDEO CONFERENCE | 515A [ 75 ] | [ ] |
| [x] AUDIO CONFERENCE | [ ] | 517A [x] |
| [x] WHITE/BLACK BOARD | [ ] | [x] |
| [x] OVERHEAD PROJECTOR | [ 50 ] | [ ] |
| [ ] AUDIO PLAYER | [ ] | [ ] |
| [x] VIDEO PLAYER | [ 20 ] | [ ] |
| [ ] AUDIO RECORDER | [ ] | [ ] |
| [x] VIDEO RECORDER | [ 10 ] | [ ] |
| [x] OTHER Computer/Internet | [ 30 ] | [ ] |
| [x] CONFERENCE ROOM | [ ] | [x] |

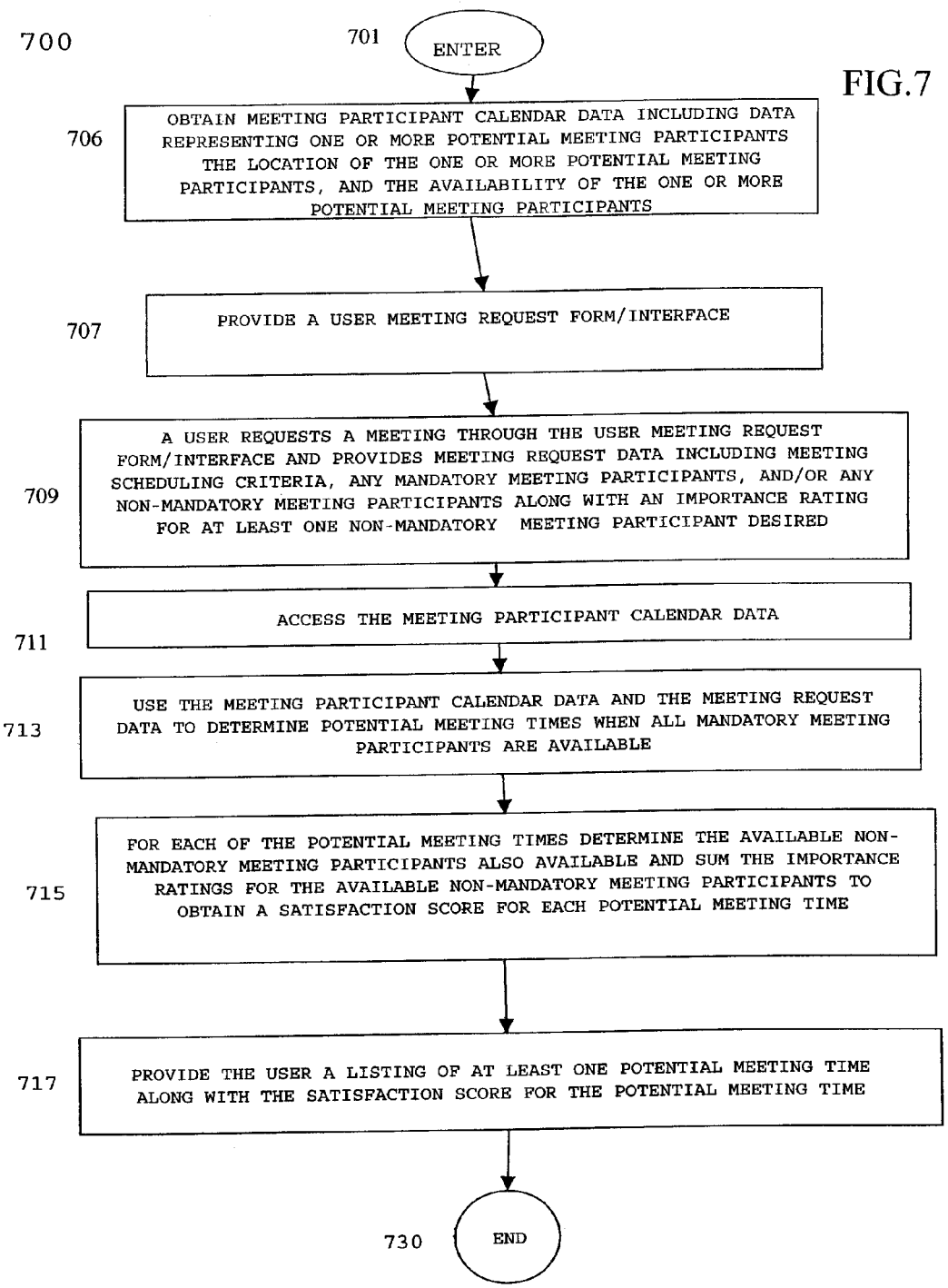

FIG. 8

MEETING REQUEST

DATE WINDOW

[1/31/07] TO [2/27/07]    801

DAYS OF THE WEEK

[MONDAY TO FRIDAY ONLY ▽]    803

TIME WINDOW

[8AM] TO [5PM]    805

LENGTH OF MEETING

[90] [MIN ▽]    807

NUMBER OF ATTENDEES

MIN [5]  MAX [10]    809

DESIRED PARTICIPANTS    811        815        817

| | NAME 813 | E-MAIL 814 | IMPORTANCE | MANDATORY |
|---|---|---|---|---|
| 1. | JOE SMITH | js@company.com | 75  815A | |
| 2. | JANE DOE | jd@company.com | 50 | |
| 3. | PHIL MCKAY | pm@company.com | | X  817A |
| 4. | SEAN LEWIS | sl@company.com | | X |
| 5. | ADAM ANT | aa@company.com | 35 | |
| 6. | VAN HALEN | vh@company.com | 20 | |
| 7. | JOE FITZ | jf@company.com | 0 | |
| 8. | GEORGE PATTON | gp@company.com | | X |
| 9. | | | | |
| 10. | | | | |
| 11. | | | | |
| 12. | | | | |
| 13. | | | | |
| 14. | | | | |
| 15. | | | | 800 |

900

RESULTS

| 903 DATE | 905 TIME | 909 SCORE |
|---|---|---|
| 2/3/07 | 10AM-11:30AM | 160/180 |
| 2/3/07 | 3PM-4:40PM | 105/180 |
| 2/17/07 | 9AM-10:30AM | 55/180 |
| 2/19/07 | 8:35AM-10:05AM | 35/180 |
| 2/26/07 | 3:20PM-4:50PM | 0/180 |

| DATE WINDOW 1101 | | DAYS OF THE WEEK |
|---|---|---|
| 1/31/07 TO 2/27/07 | | MONDAY TO FRIDAY ONLY ▽  1103 |

LENGTH OF MEETING

| 90 | MIN ▽ | 1107 |

TIME WINDOW 1105

| 8AM TO 5PM |

NUMBER OF ATTENDEES

MIN [5]   MAX [10]   1109

REQUESTED ATTENDEES 1111

| | NAME 1113 | E-MAIL 1114 | IMPORTANCE 1115 | MANDATORY 1117 |
|---|---|---|---|---|
| 1. | JOE SMITH | js@company.com | 75 | |
| 2. | JANE DOE | jd@company.com | 50 | |
| 3. | PHIL MCKAY | pm@company.com | | X |
| 4. | SEAN LEWIS | sl@company.com | | X |
| 5. | ADAM ANT | aa@company.com | 35 | |
| 6. | VAN HALEN | vh@company.com | 20 | |
| 7. | JOE FITZ | jf@company.com | 0 | |
| 8. | GEORGE PATTON | gp@company.com | | X |

EQUIPMENT/CAPABILITIES DESIRED 1131

| ITEM 1133 | IMPORTANCE 1135 | MANDATORY 1137 |
|---|---|---|
| [X] VIDEO CONFERENCE | 75 | |
| [X] AUDIO CONFERENCE | | X |
| [X] WHITE/BLACK BOARD | | X |
| [X] OVERHEAD PROJECTOR | 50 | |
| [X] VIDEO PLAYER | 20 | |
| [X] VIDEO RECORDER | 10 | |
| [X] OTHER Computer/Internet | 30 | |

1100

SYSTEM AND METHOD FOR RELATIONAL SCHEDULING OF PEOPLE AND/OR RESOURCES

BACKGROUND

The coordination and scheduling of meetings and/or other events requiring multiple participants can be a very challenging, and often frustrating, task. This is due, in part, to the fact that scheduling a meeting not only involves coordinating with each of the participants, and fitting the meeting into each of participant's individual calendars, but also the scheduling of the various meeting resources necessary for the meeting to take place, such as a conference room, conferencing equipment, audio-visual equipment, etc.

In addition, for many meetings, some participants may be required, while other participants are highly desired, but not required, and other participants are invited, but their presence is not particularly important or mandatory to achieve the meeting's goals. Likewise, some meeting resources desired for the meeting are required, while other meeting resources may be desirable, but are not mandatory to achieve the meeting's goals.

Currently, many individuals and businesses use calendar and/or appointment management systems. Typically, calendar and/or appointment management systems provide a user with the ability to view available appointment times, view scheduled appointments, and/or schedule appointments through a user interface device and a user interface display screen. In addition, many calendar and/or appointment management systems can be configured to allow other parties to view available appointment times, view scheduled appointments and/or schedule appointments on multiple individual's calendars. Some calendar and/or appointment management systems also automatically find available time slots on multiple calendars and notify/invite each of the potential participants to a proposed meeting through the participant's computing system implemented calendar and/or appointment management system and/or e-mail.

In addition, many businesses also use conference room reservation systems. Typically, conference room reservation systems give a user the ability to view conference room availability and to reserve a conference room through a user interface device and/or a user interface display screen.

As a result of the capabilities discussed above, some currently available calendar and/or appointment management systems and/or conference room reservation systems are powerful tools for scheduling meetings for multiple participants. However, currently available calendar and/or appointment management systems and conference room reservation systems are typically not integrated and neither takes into account available meeting resources beyond a capability to choose a conference room and, in some cases, the seating capacity of the conference room.

In addition, while some currently available calendar and/or appointment management systems do provide the ability to designate some participants as mandatory, and others as optional, attendees, currently available calendar and/or appointment management systems do not factor in the number of non-mandatory participants available and/or the individual importance of those participants to the goals of the meeting. Likewise, currently available conference room reservation systems do not provide the user with an opportunity to choose a meeting time based on the greatest number of desired resources available and/or the individual importance of those resources to the goals of the meeting.

SUMMARY

In accordance with one embodiment, a system and method for relational scheduling of people and/or resources allows a user desiring to schedule a meeting with the ability to enter meeting request data. In one embodiment, the meeting request data includes, but not limited to: designated participants and/or resources desired for the meeting and an importance rating/score for at least one desired participant and/or resource, including, in one embodiment, the ability to designate a given participant and/or resource as mandatory. In one embodiment, the meeting request data also includes meeting scheduling criteria such as the meeting length and meeting date and/or time frame or meeting "date window", within which the meeting is to take place. In one embodiment, the meeting request data is then used to search participant and/or resource availability data to determine one or more meeting times within the user defined meeting scheduling criteria that provide both the mandatory meeting requirements and maximize the sum of the non-mandatory participant and/or resource rating/scores for the meeting.

In accordance with one embodiment, a system and method for relational scheduling of people and/or resources includes a process for relational scheduling of resources whereby meeting resource data such as, but not limited to: available conference rooms, including seating capacity and all "permanent" hardware in the conference room such as conferencing equipment, telephones, computing systems and data access, audio/visual equipment, white/black boards, etc.; and portable meeting resources such as audio/visual recording equipment, overhead and/or computer projectors, conferencing equipment, etc. is obtained. In addition, in one embodiment, the meeting resource data includes data representing the availability of the meeting resources.

In one embodiment, a user desiring to schedule a meeting is then provided the ability to enter meeting request data such as, but not limited to, the meeting resources desired for the meeting and an importance rating/score for at least one desired meeting resource. In one embodiment, the meeting request data includes meeting scheduling criteria such as the meeting length and a meeting date and/or date window, along with various other meeting details such as number of participants, days of the week for the meeting, time of day for the meeting, etc. In one embodiment, the process for relational scheduling of resources disclosed herein then takes the meeting request data and searches the meeting resource data including the meeting resource availability data to determine one or more meeting times within the user defined meeting scheduling criteria that provide not only the mandatory meeting resource requirements, but which also maximize the sum, or meet a threshold sum, of the non-mandatory meeting resource rating/scores for the meeting. In one embodiment, the user is then provided with a listing of potential meeting times, i.e., all times when conference rooms and equipment that meet the mandatory meeting resource requirements are available, and the summed rating/score for potential meeting time.

In accordance with one embodiment, a system and method for relational scheduling of people and/or resources includes a process for relational scheduling of people whereby a user desiring to schedule a meeting is provided the ability to enter meeting request data such as, but not limited to, designated participants desired for the meeting and an importance rating/score for at least one desired participant, including, in one embodiment, the ability to designate a given participant as mandatory. In one embodiment, the meeting request data also includes one or more meeting scheduling criteria such as, but not limited to, the meeting length, a meeting date and/or date window, the days of the week the meeting is to take place, the times of day the meeting is to take place, along with other various meeting information such as the number of participants, etc.

In one embodiment, participant calendar data is obtained. In one embodiment, the participant calendar data is obtained from a computing system implemented calendar and/or appointment management system. In one embodiment, the process for relational scheduling of people then takes the meeting request data and searches the participant calendar data to determine meeting times within the user defined meeting scheduling criteria that allow not only for any mandatory participants to attend, but also maximize the sum of the non-mandatory participant ratings/scores for the meeting. In one embodiment, a listing of potential meeting times, i.e., all meeting times that include the mandatory participants, and the total rating/score for each potential meeting time is provided.

In accordance with one embodiment, a system and method for relational scheduling of people and/or resources includes a process for relational scheduling of people and resources whereby a user desiring to schedule a meeting is provided the ability to enter meeting request data such as, but not limited to, participants and meeting resources desired for the meeting and an importance rating/score for at least one desired participant and meeting resource, including, in one embodiment, the ability to designate a given participant and/or meeting resource as mandatory. In one embodiment, the meeting request data also includes one or more meeting scheduling criteria such as the meeting length, a meeting date window, the days of the week the meeting may take place, the hours of the day the meeting may take place, etc. In one embodiment, the process for relational scheduling of people and resources then takes the meeting request data and searches the participant calendar data and the meeting resource data to determine one or more meeting times within the user defined meeting scheduling criteria that provide not only the mandatory meeting requirements, but which also maximize the sum of the non-mandatory participant and resource ratings/scores for the meeting. In one embodiment, the user is then provided with a listing of potential meeting times, i.e., all meeting times that meet the mandatory requirements, and the total rating/score for each potential meeting time.

Using the system and method for relational scheduling of people and/or resources disclosed herein, the capability to determine meeting times when not only all mandatory meeting participants and/or meeting resources are available but also when the importance rating for all non-mandatory participants and/or meeting resources desired is maximized, or a threshold value is met, is provided. As a result, a user of the system and method for relational scheduling of people and/or resources disclosed herein, is given the capability to determine and schedule the "best" meeting time in terms of desired resources, capabilities and participants.

As discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 3 is a representation of an exemplary room/facility data entry form/interface for collecting meeting resource data in accordance with one embodiment;

FIG. 4 is a representation of an exemplary mobile equipment data entry form/interface for collecting meeting resource data in accordance with one embodiment;

FIG. 5 is a representation of an exemplary meeting request entry form/interface for entering meeting request data in accordance with one embodiment;

FIG. 7 is a flow chart depicting a process for relational scheduling of people in accordance with one embodiment;

FIG. 8 is a representation of an exemplary meeting request entry form/interface for entering meeting request data in accordance with one embodiment;

FIG. 9 is a representation of an exemplary listing of potential meeting times and the total satisfaction rating/score for each potential meeting time in accordance with one embodiment;

FIG. 11 is a representation of an exemplary meeting request entry form/interface for entering meeting request data in accordance with one embodiment.

Figure 1:
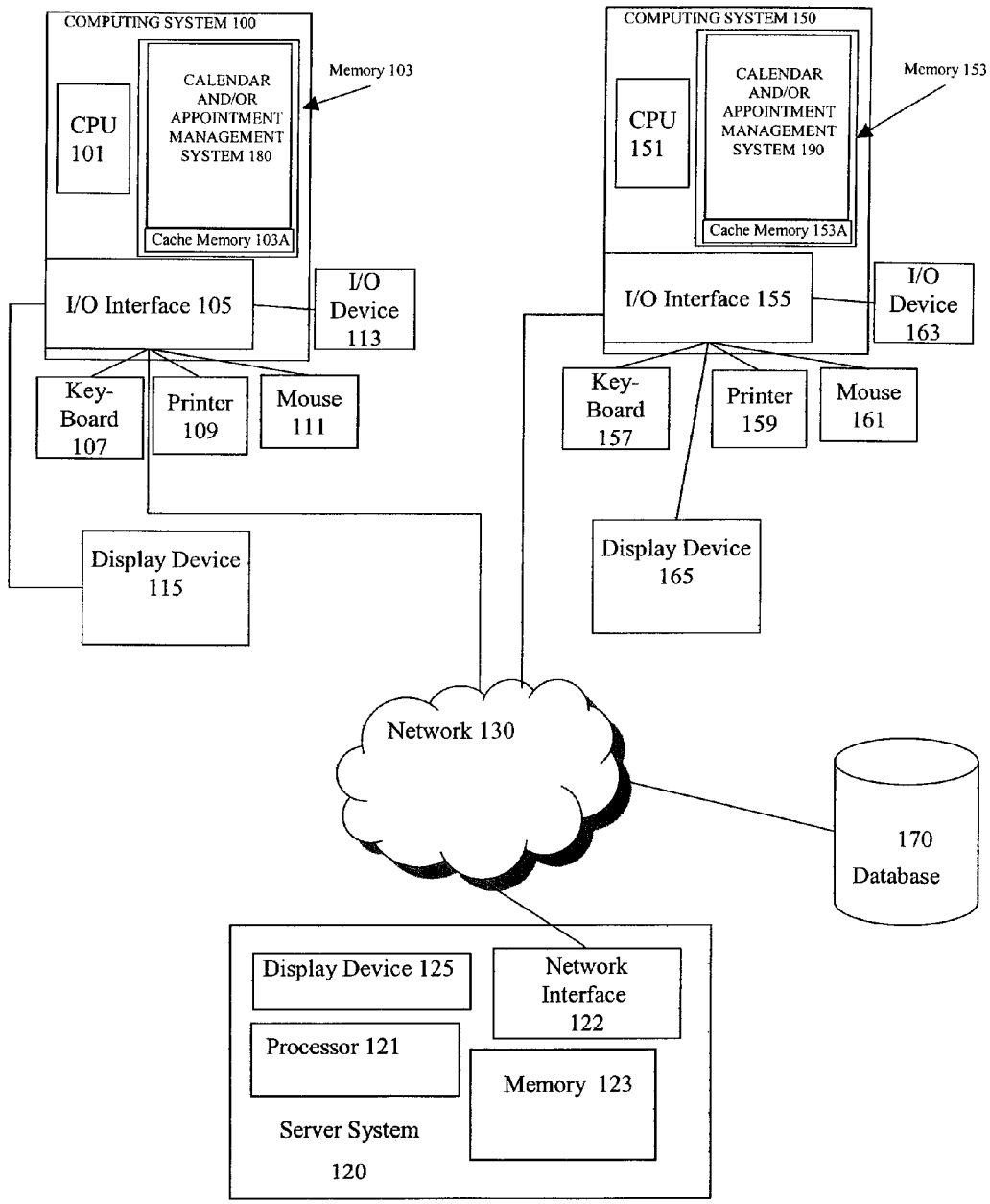
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be embodied in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a system and method for relational scheduling of people and/or resources allows a user desiring to schedule a meeting with the ability to enter meeting request data. In one embodiment, the meeting request data includes, but not limited to: designated participants and/or resources desired for the meeting and an importance rating/score for at least one desired participant and/or resource, including, in one embodiment, the ability to designate a given participant and/or resource as mandatory. In one embodiment, the meeting request data also includes meeting scheduling criteria such as the meeting length and meeting date and/or time frame or meeting "date window", within which the meeting is to take place. In one embodiment, the meeting request data is then used to search participant and/or resource availability data to determine one or more meeting times within the user defined meeting scheduling criteria that provide both the mandatory meeting requirements and maximize the sum of the non-mandatory participant and/or resource rating/scores for the meeting.

In accordance with one embodiment, a system and method for relational scheduling of people and/or resources includes a process for relational scheduling of resources whereby meeting resource data such as, but not limited to: available conference rooms, including seating capacity and all "permanent" hardware in the conference room such as conferencing equipment, telephones, computing systems and data access, audio/visual equipment, white/black boards, etc.; and portable meeting resources such as audio/visual recording equipment, overhead and/or computer projectors, conferencing equipment, etc. is obtained. In addition, in one embodiment, the meeting resource data includes data representing the availability of the meeting resources.

In one embodiment, a user desiring to schedule a meeting is then provided the ability to enter meeting request data such as, but not limited to, the meeting resources desired for the meeting and an importance rating/score for at least one desired meeting resource. In one embodiment, the meeting request data includes meeting scheduling criteria such as the meeting length and a meeting date and/or date window, along with various other meeting details such as number of participants, days of the week for the meeting, time of day for the meeting, etc. In one embodiment, the process for relational scheduling of resources disclosed herein then takes the meeting request data and searches the meeting resource data including the meeting resource availability data to determine one or more meeting times within the user defined meeting scheduling criteria that provide not only the mandatory meeting resource requirements, but which also maximize the sum, or meet a threshold sum, of the non-mandatory meeting resource rating/scores for the meeting. In one embodiment, the user is then provided with a listing of potential meeting times, i.e., all times when conference rooms and equipment that meet the mandatory meeting resource requirements are available, and the summed rating/score for potential meeting time.

In accordance with one embodiment, a system and method for relational scheduling of people and/or resources includes a process for relational scheduling of people whereby a user desiring to schedule a meeting is provided the ability to enter meeting request data such as, but not limited to, designated participants desired for the meeting and an importance rating/score for at least one desired participant, including, in one embodiment, the ability to designate a given participant as mandatory. In one embodiment, the meeting request data also includes one or more meeting scheduling criteria such as, but not limited to, the meeting length, a meeting date and/or date window, the days of the week the meeting is to take place, the times of day the meeting is to take place, along with other various meeting information such as the number of participants, etc.

In one embodiment, participant calendar data is obtained. In one embodiment, the participant calendar data is obtained from a computing system implemented calendar and/or appointment management system. In one embodiment, the process for relational scheduling of people then takes the meeting request data and searches the participant calendar data to determine meeting times within the user defined meeting scheduling criteria that allow not only for any mandatory participants to attend, but which also maximize the sum of the non-mandatory participant ratings/scores for the meeting. In one embodiment, a listing of potential meeting times, i.e., all meeting times that include the mandatory participants, and the total rating/score for each potential meeting time is provided. In one embodiment, the listing of potential meeting times also shows all participants that can attend at the potential meeting time.

In accordance with one embodiment, a system and method for relational scheduling of people and/or resources includes a process for relational scheduling of people and resources whereby a user desiring to schedule a meeting is provided the ability to enter meeting request data such as, but not limited to, participants and meeting resources desired for the meeting and an importance rating/score for at least one desired participant and meeting resource, including, in one embodiment, the ability to designate a given participant and/or meeting resource as mandatory. In one embodiment, the meeting request data also includes one or more meeting scheduling criteria such as the meeting length, a meeting date window, the days of the week the meeting may take place, the hours of the day the meeting may take place, etc. In one embodiment, the process for relational scheduling of people and resources then takes the meeting request data and searches the participant calendar data and the meeting resource data to determine one or more meeting times within the user defined meeting scheduling criteria that provide not only the mandatory meeting requirements, but which also maximize the sum of the non-mandatory participant and resource ratings/scores for the meeting. In one embodiment, a listing of potential meeting times, i.e., all meeting times that meet the mandatory requirements, and the total rating/score for each potential meeting time is provided.

Using the system and method for relational scheduling of people and/or resources disclosed herein, the capability to determine meeting times when not only all mandatory meeting participants and/or meeting resources are available but also when the importance rating for all non-mandatory participants and/or meeting resources desired is maximized, or a threshold value is met is provided. As a result, a user of the system and method for relational scheduling of people and/or resources disclosed herein, is given the capability to determine and schedule the "best" meeting time in terms of desired resources, capabilities and participants.

Some embodiments may be implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether known at the time of filing or as developed later. Some embodiments may be implemented in a mobile computing system running mobile operating systems such as Symbian® OS, Windows® Mobile, or any other operating system designed to generally manage operations on a mobile computing system, whether known at the time of filing or as developed later. As described more fully below, embodiments can be implemented on computing systems other than a conventional computing system such as, for example, a personal digital assistant, a cell phone, or other computing system capable of processing computer readable data, whether known at the time of filing or as developed later. As defined herein, computing systems also include those in which one or more computing resources (hardware or software) are located remotely and accessed via network, such as a Local Area Network (LAN), Wide Area Network (WAN), a public network, such as the Internet, a private network, a combination of network types, a computing system bus, or any other electronic medium in which data may be exchanged between one computing system and one or more other computing system(s), whether known at the time of filing or as developed later. Embodiments may be included as add-on or plug-in software for existing software programs, packages or applications, and embodiments may be a feature of an application that is bundled with a computing system or sold/provided separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, processes and/or systems described herein may make use of input provided to the computer device implementing a process and/or application, discussed herein, via user interface devices such as a keyboard, mouse, touchpad, or any other device capable of providing user input to a computing system or for translating user actions into computing system operations, whether known at the time of filing or as developed later.

Hardware System Architecture

FIG. 1 is a block diagram of an exemplary hardware architecture for implementing one embodiment of a system and method for relational scheduling of people and/or resources, such as exemplary processes 200, 700 and/or 1000 discussed herein, that includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes one or more calendar and/or appointment management systems 180 stored, in whole, or in part, therein, that is a parent system for, is used by, or includes, as discussed below, a process for relational scheduling of people and/or resources, such as exemplary processes 200, 700 and/or 1000 discussed below.

Computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for relational scheduling of people and/or resources and/or a calendar and/or appointment management system can be loaded, in whole, or in part, into computing system 100 via I/O device 113, such as from a CD, DVD, floppy disk or other medium.

Similarly, computing system 150 typically includes a CPU 151, an input/output (I/O) interface 155, and a memory system 153, including cache memory 153A. In one embodiment, memory system 153 includes one or more calendar and/or appointment management systems 190 stored, in whole, or in part, therein, that is a parent system for, is used by, or includes, as discussed below, a process for relational scheduling of people and/or resources.

Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed. As discussed in more detail below, in one embodiment, a process for relational scheduling of people and/or resources and/or a calendar and/or appointment management system, can be loaded, in whole, or in part, into computing system 150 via I/O device 163, such as from a CD, DVD or floppy disk.

Also shown in FIG. 1 is exemplary database 170. In one embodiment, database 170 is a designated server system or computing system, or a designated portion of one or more server systems or computing systems, such as computing systems 100, 150 and 120 or a distributed database. In one embodiment, database 170 is a dedicated mass storage device implemented in software, hardware, or a combination of hardware and software. In one embodiment, database 170 is a web-based function. As discussed in more detail below, in one embodiment, a process for relational scheduling of people and/or resources, such as exemplary processes 200, 700 and/or 1000, and/or computing system implemented calendar and/or appointment management system 180 and 190, are stored in whole, or in part, in database 170.

In one embodiment, computing systems 100 and 150, and database 170, are coupled to a server system 120 through network 130. Server system 120 typically includes a server system display device 125, a server system processor 121, a server system memory 123, and a server system network interface 122. As discussed in more detail below, in one embodiment, a process for relational scheduling of people and/or resources and/or a calendar and/or appointment management system are stored and/or operated in whole, or in part, in/on server system 120.

Network 130 can be any network or network system that is of interest to a user such as a Local Area Network (LAN), a Wide Area Network (WAN), a public network, such as the Internet, a private network, a combination of different network types, or other wireless, wired, and/or wireless and wired combination network capable of allowing communication between two or more computing systems, whether available or known at the time of filing or as later developed. In various embodiments, server system network interface 122 and I/O interfaces 105 and 155 include analog modems, digital modems, a network interface card, a broadband connection, or any other means for communicably coupling computing systems 100 and 150, database 170, and server system 120, via network 130, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via a network, as discussed herein. In addition, the particular type of, and configuration of, computing systems 100 and 150, database 170, and server system 120 are not relevant.

As discussed in more detail below, in one embodiment, a process for relational scheduling of people and/or resources and/or a calendar and/or appointment management system are stored in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for relational scheduling of people and/or resources and/or a calendar and/or appointment management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for relational scheduling of people and/or resources and/or a calendar and/or appointment management system is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process for relational scheduling of people and/or resources and a computing system implemented calendar and/or appointment management system by CPU 101, CPU 151, or server system processor 121, results in the operations of an agent computer process (not shown) and/or a rule computer process (not shown).

In one embodiment, a process for relational scheduling of people and/or resources and/or a calendar and/or appointment management system are computer applications or processes implemented and/or run and/or stored, in full, or in part, in, or on, a computer program product. Herein, a computer program product comprises a medium configured to store or transport computer readable code, whether available or known at the time of filing or as later developed. Some examples of computer program products are CDs, DVDs, ROM cards, floppy discs, magnetic tapes, computer hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable from the computing system.

For example, all, or part, of a process for relational scheduling of people and/or resources and/or a calendar and/or appointment management system may be stored in a memory that is physically located in a location, such as server system memory 123, or database 170, of FIG. 1, different from a computing system, such as computing systems 100 and/or 150 of FIG. 1, utilizing a process for relational scheduling of people and/or resources and/or a calendar and/or appointment management system. In one embodiment, all, or part, of a process for relational scheduling of people and/or resources and/or a calendar and/or appointment management system may be stored in a memory that is physically located, separate from the computing system's processor(s), such as CPUs 101 and 151 of FIG. 1, and the computing system processor(s) can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server systems, such as computing systems 100 and/or 150 and/or server system 120 of FIG. 1, running and/or utilizing and/or storing all, or part, of a process for relational scheduling of people and/or resources and/or a calendar and/or appointment management system, discussed herein, is a portable computer, a workstation, a two-way pager, a cellular telephone, a smart phone, a digital wireless telephone, a personal digital assistant, a server computer, an Internet appliance, or any other device that includes components that can execute all, or part, of a process for relational scheduling of people and/or resources and/or a calendar and/or appointment management system, discussed herein, in accordance with at least one of the embodiments as described herein. Similarly, in another embodiment, a process for relational scheduling of people and/or resources and/or a calendar and/or appointment management system, discussed herein, may be implemented on and/or run and/or stored on a computing system and/or server system that is comprised of multiple different computers, wireless devices, cellular telephones, digital telephones, two-way pagers, personal digital assistants, server computers, or any desired combination of these devices, that are coupled to perform the processes and/or operations as described herein. Process Herein, the term user denotes any individual party or organization implementing and/or interfacing with a system and method for relational scheduling of people and/or resources and/or a process for relational scheduling of resources and/or a process for relational scheduling of people and/or a process for relational scheduling of people and resources, as disclosed herein.

Herein, the term computing system and/or user computing system and/or participant computing system includes computing systems such as computing systems 100 or 150 of FIG. 1 discussed above. As also discussed above, in some embodiments, the term computing system and/or user computing system and/or participant computing system includes a portable computer, a workstation, a two-way pager, a cellular telephone, a smart phone, a digital wireless telephone, a personal digital assistant, a server computer, an Internet appliance, or any other device that includes components that can execute all, or part, of a process for relational scheduling of people and/or resources, and/or a computing system implemented calendar and/or appointment management system and/or a computing system implemented conference room reservation system in accordance with at least one of the embodiments as described herein. Similarly, in another embodiment, a process for relational scheduling of people and/or resources and/or a computing system implemented calendar and/or appointment management system and/or a computing system implemented conference room reservation system, discussed herein, may be implemented on and/or run and/or stored on a computing system and/or server system that is comprised of multiple different computers, wireless devices, cellular telephones, digital telephones, two-way pagers, personal digital assistants, server computers, or any desired combination of these devices, that are coupled to perform the processes and/or operations as described herein.

In accordance with one embodiment, a process for relational scheduling of resources provides a user desiring to schedule a meeting with the ability to enter meeting request data. In one embodiment, the meeting request data includes, but is not limited to, designated meeting resources desired for the meeting and an importance rating/score for at least one desired meeting resource, including, in one embodiment, the ability to designate a given meeting resource as mandatory. In one embodiment, the meeting request data also includes one or more meeting scheduling criteria such as the meeting length and a meeting date and/or time frame or meeting "date window", within which the meeting is to take place. In one embodiment, the meeting request data is then used to search meeting resource data, including meeting resource availability data, to determine one or more meeting times within the user defined meeting scheduling criteria that provides both the mandatory meeting requirements and maximizes the sum of the non-mandatory meeting resource rating/scores for the meeting.

Figure 2:
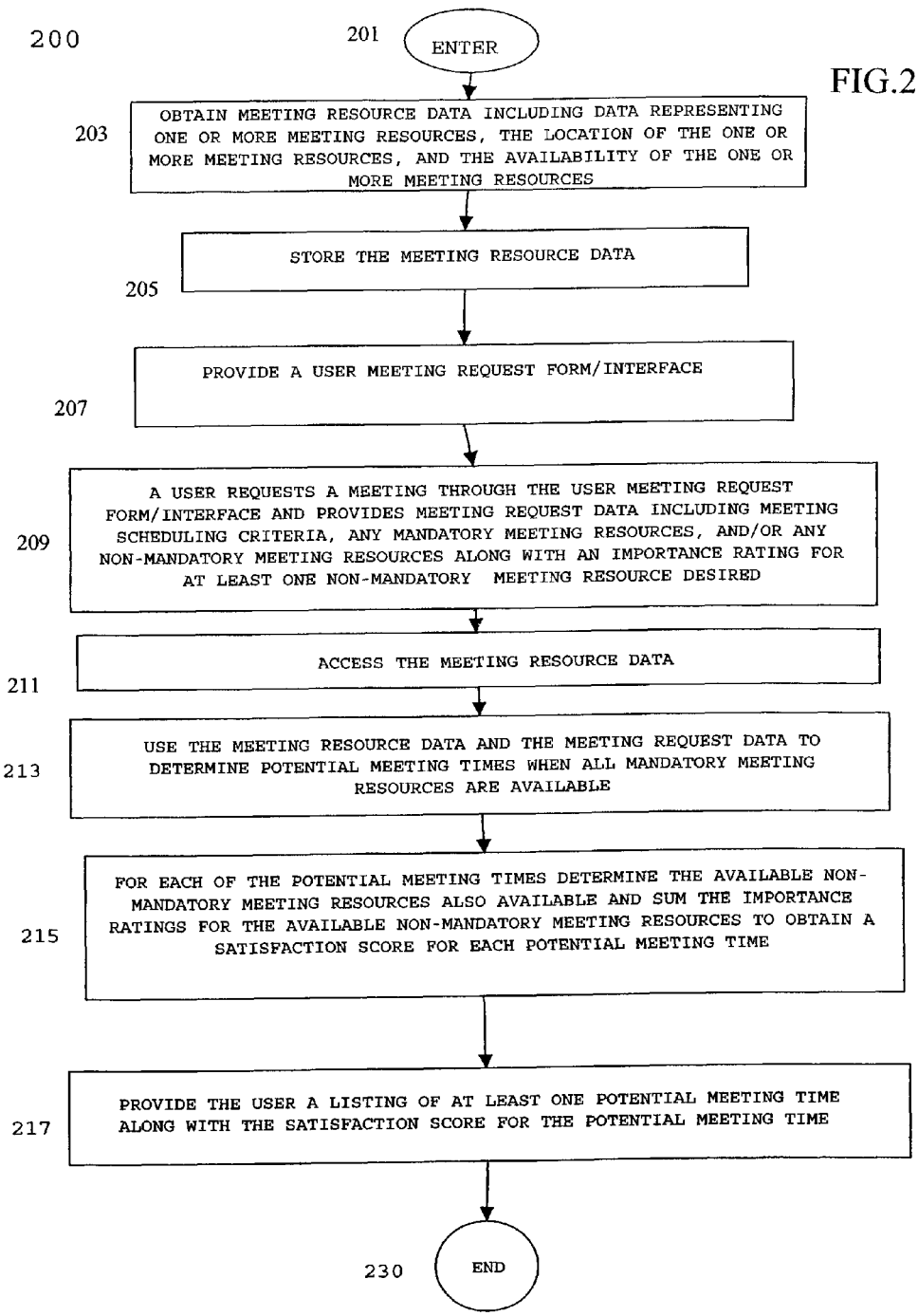
FIG. 2 is a flow chart depicting a process for relational scheduling of resources in accordance with one embodiment.

FIG. 2 a flow chart depicting a process for relational scheduling of resources 200 in accordance with one embodiment. Process for relational scheduling of resources 200 begins at ENTER OPERATION 201 of FIG. 2 and process flow proceeds to OBTAIN MEETING RESOURCE DATA INCLUDING DATA REPRESENTING ONE OR MORE MEETING RESOURCES, THE LOCATION OF THE ONE OR MORE MEETING RESOURCES, AND THE AVAILABILITY OF THE ONE OR MORE MEETING RESOURCES OPERATION 203.

In one embodiment, at OBTAIN MEETING RESOURCE DATA INCLUDING DATA REPRESENTING ONE OR MORE MEETING RESOURCES, THE LOCATION OF THE ONE OR MORE MEETING RESOURCES, AND THE AVAILABILITY OF THE ONE OR MORE MEETING RESOURCES OPERATION 203, meeting resource data such as, but not limited to: available conference rooms, including seating capacity and all "permanent" hardware in the conference room such as conferencing equipment, telephones, computing systems and data access, audio/visual equipment, white/black boards, etc.; and portable meeting resources such as conferencing equipment, telephones, computing systems and data access, audio/visual equipment, white/black boards, etc., is collected.

In one embodiment, the meeting resource data is collected by manually entering the data into a computing system, such as computing systems 100, 153 and/or server system 120, of FIG. 1 using a user interface device such as a keyboard, such as keyboards 107, 157, a mouse, such as mice 111, 161, a touch pad, voice recognition software, or any other device capable of providing user input to a computing system and/or for translating user actions into computing system operations, whether known at the time of filing or as developed later. In one embodiment, the meeting resource data is collected by entering the data into a computing system using a room/facility data entry form and/or interface and/or a mobile equipment data entry form and/or interface.

FIG. 3 is a representation of an exemplary room/facility data entry form/data entry interface 300 used to enter meeting resource data into a computing system and/or process for relational scheduling of resources 200 (FIG. 2) in accordance with one embodiment. In one embodiment, room/facility data entry form/data entry interface 300 (FIG. 3) is a hardcopy form. In one embodiment, room/facility data entry form/data entry interface 300 is an electronic form displayed on a display device, such as display devices 115, 165, 125 of computing systems 100, 151 and/or server system 120 of FIG. 1. In one embodiment, room/facility data entry form/data entry interface 300 is an electronic user interface displayed on a display device, such as display devices 115, 165, 125 of computing systems 100, 151 and/or server system 120 of FIG. 1.

Returning to FIG. 3, in this example, the meeting resources being entered include a conference room itself and all the included meeting resources present in the conference room. As seen in FIG. 3, in this particular example, room/facility data entry form/data entry interface 300 includes: room field 301, where the room number is entered, in this example room 101; maximum seating field 303, where the maximum number of seats in the room is entered, in this example 25; and included equipment/capabilities listing 305 where various possible meeting resources associated with a conference room are listed. In this specific example, included equipment/capabilities listing 305 includes check boxes 309 where the presence of a given listed meeting resource is indicated by placing an "x" in the associated check box for the meeting resource and the number of the meeting resource units is also indicated in a number field 311 associated with each meeting resource listed.

In some instances, meeting resources are not associated with a particular conference room but are mobile meeting resources that can be moved to a desired location. In one embodiment, these mobile meeting resources are also entered as meeting resource data.

FIG. 4 is a representation of an exemplary mobile equipment data entry form/data entry interface 400 used to enter mobile meeting resource data in accordance with one embodiment. In one embodiment, mobile equipment data entry form/data entry interface 400 is a hardcopy form. In one embodiment, mobile equipment data entry form/data entry interface 400 is an electronic form displayed on a display device, such as display devices 115, 165, 125 of computing systems 100, 151 and/or server system 120 of FIG. 1. In one embodiment, mobile equipment data entry form/data entry interface 400 is an electronic user interface displayed on a display device, such as display devices 115, 165, 125 of computing systems 100, 151 and/or server system 120 of FIG. 1.

Returning to FIG. 4, in one embodiment, mobile equipment data entry form/data entry interface 400 includes: item name field 401 where the generalized name/function of the meeting resource is entered and item description field 403 where a more detailed description of the meeting resource is provided.

FIGS. 3 and 4 show specific examples of a room/facility data entry form/data entry interface and a mobile equipment data entry form/data entry interface. Those of skill in the art will readily recognize that the choice of information displayed, the organization of the information displayed, and the manner in which the information is displayed was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information are possible, and that the specific means discussed above do not limit the invention as set forth in the claims below.

In addition, as discussed above, FIGS. 3 and 4 show specific examples of a room/facility data entry form/data entry interface and a mobile equipment data entry form/data entry interface as might be displayed on a computing system display. However, as noted above, room/facility data entry form/data entry interface 300 and mobile equipment data entry form/data entry interface 400 can take other forms in other embodiments such as, but not limited to: printed forms; displays on a portable computer, a workstation, a two-way pager, a cellular telephone, a smart phone, a digital wireless telephone, a personal digital assistant, a server computer, an Internet appliance, or any other device that includes components capable of processing computer readable data, whether known at the time of filing or as developed later; attachments to e-mails; and/or any other form of text or text display capable of conveying/entering information whether known at the time of filing or as developed later.

In addition to the meeting resource data denoting the meeting resources and their location, in one embodiment, the meeting resource data also includes data representing the availability of the meeting resources. In one embodiment, the availability of the meeting resources data includes a meeting resource reservation system and calendar indicating when a given resource is available and when it is reserved. In one embodiment, the availability of the resources data is gathered from existing systems, such as a computing system implemented conference room reservation system. As used herein, the term computing system implemented conference room reservation system and the term conference room reservation system are used interchangeable to denote any computing system implemented process, application, module, program, component of a software system, component of a software package, component of a parent system, plug-in, or a feature of a parent system, whereby a user can process, track and display meeting resources and the availability of those meeting resources. In one embodiment, the computing system implemented conference room reservation system is a module and/or feature of a parent computing system implemented resource management system that can, as an example, provide the user the ability to view meeting resources and/or determine future availability of meeting resources. As noted above, several conference room reservation systems are currently available and are well known to those of skill in the art.

In one embodiment, once meeting resource data such as, but not limited to, data denoting the meeting resources, data representing the meeting resources locations, and data representing the availability of the resources, is collected at OBTAIN MEETING RESOURCE DATA INCLUDING DATA REPRESENTING ONE OR MORE MEETING RESOURCES, THE LOCATION OF THE ONE OR MORE MEETING RESOURCES, AND THE AVAILABILITY OF THE ONE OR MORE MEETING RESOURCES OPERATION 203, process flow proceeds to STORE THE MEETING RESOURCE DATA OPERATION 205.

In one embodiment, at STORE THE MEETING RESOURCE DATA OPERATION 205, the meeting resource data is stored, remotely or locally, in whole, or in part, in a database, such as database 170 in FIG. 1, maintained by, accessible by, owned by, or otherwise related to, a provider of process for relational scheduling of resources 200 and/or the user, and/or any third party, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memories 103A, 153A of FIG. 1, or in any main memory or mass memory, associated with a computing device, such as computing systems 100, 150 described above. In one embodiment, the data, in whole, or in part, is stored in any computing device and/or server system, such as computing systems 100, 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the data stored as described above is maintained, in whole, or in part, locally or remotely, by: the provider of process for relational scheduling of resources 200; the user; a third party data storage institution; any third party service or institution; or any other parties.

In one embodiment, once the meeting resource data is stored at STORE THE MEETING RESOURCE DATA OPERATION 205, process flow proceeds to PROVIDE A USER MEETING REQUEST FORM/INTERFACE OPERATION 207.

In one embodiment, at PROVIDE A USER MEETING REQUEST FORM/INTERFACE OPERATION 207, a user wishing to schedule a meeting is provided with a meeting request form/interface for entering meeting request data that will be used to find optimized meeting times when mandatory meeting resources are available and important non-mandatory meeting resources are also available.

FIG. 5 is a representation of an exemplary meeting request entry form/interface 500 for entering meeting request data in accordance with one embodiment. In one embodiment, meeting request entry form/interface 500 is a hardcopy form. In one embodiment, meeting request entry form/interface 500 is an electronic form displayed on a display device, such as display devices 115, 165, 125 of computing systems 100, 151 and/or server system 120 of FIG. 1. In one embodiment, meeting request entry form/interface 500 is an electronic user interface displayed on a display device, such as display devices 115, 165, 125 of computing systems 100, 151 and/or server system 120 of FIG. 1.

Returning to FIG. 5, in one embodiment, meeting request entry form/interface 500 includes: date window field 501; day of week window field 503; time window field 505; length of meeting field 507; number of attendees field 509; and equipment/capabilities desired listing 511, including meeting resources listing 513, importance fields 515, and mandatory designation fields 517.

In the specific example shown in FIG. 5, meeting request entry form/interface 500 includes date window field 501 where, in one embodiment, a user can enter a range or "window" of dates when the meeting is to take place. The entered date window will determine the time frame that process for relational scheduling of resources 200 (FIG. 2) will use to conduct its search as discussed below. In one embodiment, date window field 501 (FIG. 5) allows the user to designate the earliest date on which the meeting is to occur and the latest date on which the meeting may occur. This feature allows the user to leave time for meeting preparation, or for prerequisite events to occur, and to ensure any deadlines for the meeting are met. In other embodiments, a user enters a latest date on which the meeting can take place and the present date is assumed to be the beginning date or earliest date. In other embodiments, the user enters an earliest date for the meeting a window is created for a predetermined future time frame such as two weeks.

In the specific example shown in FIG. 5, meeting request entry form/interface 500 includes day of week window field 503 where a user can designate the days of the week on which the meeting can take place. Day of week window field 503 allows the user to designate specific day(s) of the week for the meeting. This allows the user to avoid scheduling the meeting on particularly busy weekdays, like Monday of Fridays, and/or impractical days such as weekends. In one embodiment, day of week window field 503 includes a pull-down menu and/or listing of days of the week for the user to chose.

In the specific example shown in FIG. 5, meeting request entry form/interface 500 includes length of meeting field 507 where a user designates the length of the meeting. In one embodiment, length of meeting field 507 allows the user to choose the unit of time, such as minutes or hours, from a pull-down menu and/or listing of units of time.

In the specific example shown in FIG. 5, meeting request entry form/interface 500 includes number of attendees field 509 where a user can designate the number of attendees of the meeting. In one embodiment, number of attendees field 509 includes a minimum and maximum number so that scheduling alternatives can be factored in and offered such as different possible conference room sizes/seating capabilities.

In the specific example shown in FIG. 5, meeting request entry form/interface 500 includes equipment/capabilities desired listing 511. In one embodiment, equipment/capabilities desired listing 511 includes meeting resources listing 513 that lists potential meeting resources the user may desire. In one embodiment, meeting resources listing 513 also includes resource desired check boxes 512 where, in this specific example, a user can indicate a desired meeting resource by placing a mark in the resource desired check box 512 associated with the desired meeting resource.

In one embodiment, equipment/capabilities desired listing 511 includes importance fields 515 and mandatory designation fields 517. In one embodiment, importance fields 515 and mandatory designation fields 517 are each associated with a specific meeting resource listed in meeting resources listing 513. According to one embodiment, any meeting resource desired by the user, as indicated in one embodiment by placing a mark in the resource desired check box 512 associated with the desired meeting resource, is given an importance rating and/or mandatory status. In other embodiments, any desired meeting resource not given a specific importance rating is automatically given a default predefined importance rating such as, in one example, an importance score of zero, or any other predefined default score. In the specific example shown in FIG. 5, the user is given the choice of either designating a given desired meeting resource as mandatory, for instance see the audio conference listing and exemplary mandatory designation field 517A, or giving a given desired meeting resource a non-mandatory importance rating/score, for instance see video conference listing and exemplary importance rating field 515A. As discussed below, process for relational scheduling of resources 200 (FIG. 2) uses this information to ensure all mandatory meeting resources are available and to maximize the sum of the importance ratings/scores.

Returning to FIG. 5, while in the specific example of meeting request entry form/interface 500 shown in FIG. 5 separate importance fields 515 and mandatory designation fields 517 are shown, in other embodiments, a given meeting resource is designated mandatory by assigning a particular importance score. In one instance the importance score indicating mandatory status can be a predefined score. In other instances, the importance score indicating mandatory status is a score that is greater than all other importance scores when summed.

In addition, while in the specific example of meeting request entry form/interface 500 shown in FIG. 5 a numerical value is shown as the importance rating/score, in other embodiments, the importance rating is provided using letters, codes, or virtually any discrete symbol or symbols. In addition, any singular or multiple symbol or graphical or audio display capable of representing a level of importance may be used. As an example, a thermometer, a sliding scale, a number from a designated number scale, any graphical representation, or any partially filed figure or symbol, or outline thereof, or audio recording, may be used. Moreover, these symbols, graphical displays, and scales may, in some embodiments, display either a level of importance or unimportance. Consequently the embodiment discussed above was chosen for illustrative purposes only and does not limit the scope as claimed.

FIG. 5 shows a specific example of a meeting request entry form/interface. Those of skill in the art will readily recognize that the choice of information displayed, the organization of the information displayed, and the manner in which the information is displayed, was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information are possible, and that the specific means discussed above do not limit the invention as set forth in the claims below.

In addition, as discussed above, FIG. 5 shows a specific example of meeting request entry form/interface 500 as might be displayed on a computing system display. However, as noted above, meeting request entry form/interface 500 can take other forms in other embodiments such as, but not limited to: printed forms; displays on a portable computer, a workstation, a two-way pager, a cellular telephone, a smart phone, a digital wireless telephone, a personal digital assistant, a server computer, an Internet appliance, or any other device that includes components capable of processing computer readable data, whether known at the time of filing or as developed later; attachments to e-mails; and/or any other form of text or text display capable of conveying/entering information whether known at the time of filing or as developed later.

In one embodiment, once a user wishing to schedule a meeting is provided with a meeting request form/interface for entering meeting request data at PROVIDE A USER MEETING REQUEST FORM/INTERFACE OPERATION 207, process flow proceeds to A USER REQUESTS A MEETING THROUGH THE USER MEETING REQUEST FORM/INTERFACE AND PROVIDES MEETING REQUEST DATA INCLUDING MEETING SCHEDULING CRITERIA, ANY MANDATORY MEETING RESOURCES, AND/OR ANY NON-MANDATORY MEETING RESOURCES ALONG WITH AN IMPORTANCE RATING FOR AT LEAST ONE NON-MANDATORY MEETING RESOURCE DESIRED OPERATION 209.

In one embodiment, at A USER REQUESTS A MEETING THROUGH THE USER MEETING REQUEST FORM/INTERFACE AND PROVIDES MEETING REQUEST DATA INCLUDING MEETING SCHEDULING CRITERIA, ANY MANDATORY MEETING RESOURCES, AND/OR ANY NON-MANDATORY MEETING RESOURCES ALONG WITH AN IMPORTANCE RATING FOR AT LEAST ONE NON-MANDATORY MEETING RESOURCE DESIRED OPERATION 209, a user enters meeting request data into a computing system, and/or process for relational scheduling of resources 200 (FIG. 2) using a user interface device such as a keyboard, mouse, touchpad, or any other device capable of providing user input to a computing system or for translating user actions into computing system operations, as discussed herein, and/or known at the time of filing and/or as developed later.

In one embodiment, the meeting request data includes meeting scheduling criteria such as, but not limited to: a time frame for the meeting including a date range when the meeting is to occur; the length of the meeting, i.e., how long the meeting will last; days of the week on which the meeting can take place; times of day when the meeting can takes place; number of attendees, minimum and maximum; etc. In one embodiment, the meeting request data also includes, but is not limited to: any meeting resources required for the meeting, i.e., all mandatory meeting resources; and any desired, but non-mandatory meeting resources, along with an importance rating for at least one of the non-mandatory meeting resources. In one embodiment, the meeting request data is entered using the meeting request form/interface for entering meeting request data of PROVIDE A USER MEETING REQUEST FORM/INTERFACE OPERATION 207.

Returning to FIG. 5, meeting request entry form/interface 500 is shown as having been filled out by a user at A USER REQUESTS A MEETING THROUGH THE USER MEETING REQUEST FORM/INTERFACE AND PROVIDES MEETING REQUEST DATA INCLUDING MEETING SCHEDULING CRITERIA, ANY MANDATORY MEETING RESOURCES, AND/OR ANY NON-MANDATORY MEETING RESOURCES ALONG WITH AN IMPORTANCE RATING FOR AT LEAST ONE NON-MANDATORY MEETING RESOURCE DESIRED OPERATION 209 (FIG. 2).

In the specific example of FIG. 5, through meeting request entry form/interface 500, a user entered the following meeting scheduling criteria including: a time frame for the meeting of Jan. 31, 2007 to Feb. 27, 2007 using date window field 501; the meeting must take place during the work week and between 8 AM and 5 PM using day of week window field 503 and time window field 505; and a meeting having a length of 90 minutes through length of meeting field 507. In this particular example, the user has also indicated the minimum number of attendees as 5 and the maximum as 10 using number of attendees field 509.

As also seen in FIG. 5, through meeting request entry form/interface 500, a user has requested video conference capability, audio conference capability, a white/black board, an overhead projector, a video player, a video recorder, a conference room and a computing system with Internet access using equipment/capabilities desired listing 511, including meeting resources listing 513.

As also seen in FIG. 5, through meeting request entry form/interface 500, a user has indicated that the audio conference, white/black board, and conference room are mandatory for the requested meeting by marking the mandatory designation fields 517 associated with the audio conference, white/black board and conference room listings.

As also seen in FIG. 5, through meeting request entry form/interface 500, a user has given: video conference capability an importance rating of 75; overhead projector an importance rating of 50; video player an importance rating of 20; and video recorder an importance rating of 10.

In one embodiment, once a user enters meeting request data into process for relational scheduling of resources 200 (FIG. 2) at A USER REQUESTS A MEETING THROUGH THE USER MEETING REQUEST FORM/INTERFACE AND PROVIDES MEETING REQUEST DATA INCLUDING MEETING SCHEDULING CRITERIA, ANY MANDATORY MEETING RESOURCES, AND/OR ANY NON-MANDATORY MEETING RESOURCES ALONG WITH AN IMPORTANCE RATING FOR AT LEAST ONE NON-MANDATORY MEETING RESOURCE DESIRED OPERATION 209, process flow proceeds to ACCESS THE MEETING RESOURCE DATA OPERATION 211.

In one embodiment, at ACCESS THE MEETING RESOURCE DATA OPERATION 211 the meeting resource data obtained at OBTAIN MEETING RESOURCE DATA INCLUDING DATA REPRESENTING ONE OR MORE MEETING RESOURCES, THE LOCATION OF THE ONE OR MORE MEETING RESOURCES, AND THE AVAILABILITY OF THE ONE OR MORE MEETING RESOURCES OPERATION 203 and stored at STORE THE MEETING RESOURCE DATA OPERATION 205 is accessed by process for relational scheduling of resources 200.

In some embodiments, access to the meeting resource data is had by providing access to the meeting resource data and/or providing the user with the meeting resource data on computer program product.

In other embodiments, access to the meeting resource data is provided through a network of computing systems and/or server systems that is comprised of multiple different computers, wireless devices, cellular telephones, digital telephones, two-way pagers, personal digital assistants, server computers, or any desired combination of these devices, that are coupled using a network, such as network 130 of FIG. 1. As discussed above, network 130 can be any network or network system that is of interest to a user such as a Local Area Network (LAN), a Wide Area Network (WAN), a public network, such as the Internet, a private network, a combination of network types, or other network capable of allowing communication between two or more computing systems, whether available or known at the time of filing or as later developed.

In other embodiments, access to the meeting resource data is provided through e-mail or through text messaging. In other embodiments, access to the meeting resource data is provided through any method, apparatus, process or mechanism for transferring and/or viewing data and/or text from one or more devices, computing systems, server systems, databases, web site/web functions and/or any devices having a data storage capability to and/or by one or more other devices, computing systems, server systems, databases, web site/web functions and/or any devices having a data storage capability, whether known at the time of filing or as thereafter developed.

In one embodiment, once the meeting resource data is accessed by process for relational scheduling of resources 200 at ACCESS THE MEETING RESOURCE DATA OPERATION 211, process flow proceeds to USE THE MEETING RESOURCE DATA AND THE MEETING REQUEST DATA TO DETERMINE POTENTIAL MEETING TIMES WHEN ALL MANDATORY MEETING RESOURCES ARE AVAILABLE OPERATION 213.

In one embodiment, at USE THE MEETING RESOURCE DATA AND THE MEETING REQUEST DATA TO DETERMINE POTENTIAL MEETING TIMES WHEN ALL MANDATORY MEETING RESOURCES ARE AVAILABLE OPERATION 213, the meeting request data from A USER REQUESTS A MEETING THROUGH THE USER MEETING REQUEST FORM/INTERFACE AND PROVIDES MEETING REQUEST DATA INCLUDING MEETING SCHEDULING CRITERIA, ANY MANDATORY MEETING RESOURCES, AND/OR ANY NON-MANDATORY MEETING RESOURCES ALONG WITH AN IMPORTANCE RATING FOR AT LEAST ONE NON-MANDATORY MEETING RESOURCE DESIRED OPERATION 209 is used to search the meeting resource data of OBTAIN MEETING RESOURCE DATA INCLUDING DATA REPRESENTING ONE OR MORE MEETING RESOURCES, THE LOCATION OF THE ONE OR MORE MEETING RESOURCES, AND THE AVAILABILITY OF THE ONE OR MORE MEETING RESOURCES OPERATION 203 to determine/find potential meeting times that meet all of the user entered meeting scheduling criteria such as, but not limited to, the meeting time frame, meeting length and when all of the mandatory meeting resources are available.

In one embodiment, the meeting scheduling criteria the user entered as part of the meeting request data, i.e., the meeting time frame, meeting length, and any other user provided meeting scheduling criteria, such as specified days of the week and times of the day, are identified from the meeting request data. In one embodiment, the meeting resource availability data for each of the mandatory meeting resources is then searched to find times, within the user defined meeting scheduling criteria of the meeting request data, when all of the mandatory meeting resources are available. In one embodiment, each of the times when all of the mandatory meeting resources are available within the user defined meeting scheduling criteria is designated a potential meeting time.

Figure 6:
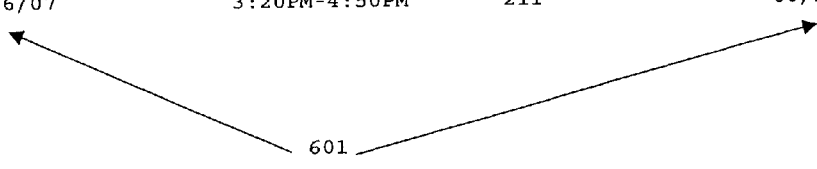
FIG. 6 is a representation of an exemplary listing of potential meeting times and the total satisfaction rating/score for each potential meeting time in accordance with one embodiment.

As a specific example, referring back to FIG. 5, recall a user had designated audio conference, white/black board, and conference room as mandatory meeting resources using the associated mandatory designation fields 517. In addition, recall that the user also indicated: the meeting had to take place between Jan. 31, 2007 and Feb. 27, 2007 using date window field 501; the meeting had to be on a weekday using day of week window field 503; the meeting had to take place between 8 AM and 5 PM using time window field 505; the meeting was for 90 minutes using length of meeting field 507; and that a minimum of 5 seats were required using number of attendees field 509. Consequently, in this specific example, the meeting resource availability data for each of the mandatory meeting resources audio conference, white/black board and conference room is searched to find times when audio conference capability, white/black board capability, and a conference room having at least five seats is available within the time frame of Jan. 31, 2007 and February 27, on a weekday between 8 AM and 5 PM and for 90 minutes. Then, each of the times when all of the above criteria are met is designated a potential meeting time. As an example, and as discussed in more detail below, FIG. 6 shows potential meeting times 601 that, in this specific example, fulfill the meeting request data and criteria are therefore designated potential meeting times.

Methods, processes, means and mechanisms for searching data, such as meeting resource data, using search parameter data, such as meeting request data, are well known to those of skill in the art. Consequently, a more detailed discussion of methods, processes, means, and mechanisms for searching data, such as meeting resource data, using search parameter data, such as meeting request data, is omitted here to avoid detracting from the invention.

In addition, those of skill in the art will readily recognize that the order of operations discussed above was presented for illustrative purposes only and that other orders of operations, and combination of operations, are possible. Consequently, the order of operations discussed above does not limit the invention as claimed.

Returning to FIG. 2, in one embodiment, once the meeting resource data is searched using the meeting request data and potential meeting times are identified/determined at USE THE MEETING RESOURCE DATA AND THE MEETING REQUEST DATA TO DETERMINE POTENTIAL MEETING TIMES WHEN ALL MANDATORY MEETING RESOURCES ARE AVAILABLE OPERATION 213, process flow proceeds to FOR EACH OF THE POTENTIAL MEETING TIMES DETERMINE THE AVAILABLE NON-MANDATORY MEETING RESOURCES ALSO AVAILABLE AND SUM THE IMPORTANCE RATINGS FOR THE AVAILABLE NON-MANDATORY MEETING RESOURCES TO OBTAIN A SATISFACTION SCORE FOR EACH POTENTIAL MEETING TIME OPERATION 215.

In one embodiment, at FOR EACH OF THE POTENTIAL MEETING TIMES DETERMINE THE AVAILABLE NON-MANDATORY MEETING RESOURCES ALSO AVAILABLE AND SUM THE IMPORTANCE RATINGS FOR THE AVAILABLE NON-MANDATORY MEETING RESOURCES TO OBTAIN A SATISFACTION SCORE FOR EACH POTENTIAL MEETING TIME OPERATION 215, each of the potential meeting times identified/determined at USE THE MEETING RESOURCE DATA AND THE MEETING REQUEST DATA TO DETERMINE POTENTIAL MEETING TIMES WHEN ALL MANDATORY MEETING RESOURCES ARE AVAILABLE OPERATION 213 is further analyzed to determine the number of non-mandatory meeting resources also available at each of the potential meeting times. Then, in one embodiment, the sum of the importance ratings associated with the non-mandatory meeting resources also available at each of the potential meeting times is calculated to determine a total "satisfaction" rating/score for each of the potential meeting times.

In one embodiment, non-mandatory meeting resources and their associated importance ratings are obtained from the meeting request data entered by the user at A USER REQUESTS A MEETING THROUGH THE USER MEETING REQUEST FORM/INTERFACE AND PROVIDES MEETING REQUEST DATA INCLUDING MEETING SCHEDULING CRITERIA, ANY MANDATORY MEETING RESOURCES, AND/OR ANY NON-MANDATORY MEETING RESOURCES ALONG WITH AN IMPORTANCE RATING FOR AT LEAST ONE NON-MANDATORY MEETING RESOURCE DESIRED OPERATION 209. Then, in one embodiment, the meeting resource availability data for each of the non-mandatory meeting resources is obtained and compared to the potential meeting times identified/determined at USE THE MEETING RESOURCE DATA AND THE MEETING REQUEST DATA TO DETERMINE POTENTIAL MEETING TIMES WHEN ALL MANDATORY MEETING RESOURCES ARE AVAILABLE OPERATION 213.

In one embodiment, for each potential meeting time identified/determined at USE THE MEETING RESOURCE DATA AND THE MEETING REQUEST DATA TO DETERMINE POTENTIAL MEETING TIMES WHEN ALL MANDATORY MEETING RESOURCES ARE AVAILABLE OPERATION 213, the number of available non-mandatory meeting resources also available at the potential meeting time is determined. Then, in one embodiment, the user entered importance ratings for each of the non-mandatory meeting resources available at the potential meeting time are summed. In one embodiment, the sum of the importance ratings for each potential meeting time is then designated a total satisfaction score for that potential meeting time.

Continuing with the specific example of FIG. 5 and FIG. 6, each of the potential meeting times 601 listed in FIG. 6 includes a satisfaction score 609 that is the sum of the importance ratings of the non-mandatory meeting resources also available at the given potential meeting time.

Methods, processes, means and mechanisms for searching data, such as meeting resource data, using search parameter data, such as meeting request data, are well known to those of skill in the art. Consequently, a more detailed discussion of methods, processes, means, and mechanisms for searching data, such as meeting resource data, using search parameter data, such as meeting request data, is omitted here to avoid detracting from the invention.

Methods, processes, means and mechanisms for calculating sums and summing data, such as importance ratings data, are well known to those of skill in the art. Consequently, a more detailed discussion of methods, processes, means, and mechanisms for calculating sums and summing data, such as importance ratings data, is omitted here to avoid detracting from the invention.

In addition, those of skill in the art will readily recognize that the order of operations discussed above was presented for illustrative purposes only and that other orders of operations, and combination of operations, are possible. As an example, in one embodiment, the operations USE THE MEETING RESOURCE DATA AND THE MEETING REQUEST DATA TO DETERMINE POTENTIAL MEETING TIMES WHEN ALL MANDATORY MEETING RESOURCES ARE AVAILABLE OPERATION 213 and FOR EACH OF THE POTENTIAL MEETING TIMES DETERMINE THE AVAILABLE NON-MANDATORY MEETING RESOURCES ALSO AVAILABLE AND SUM THE IMPORTANCE RATINGS FOR THE AVAILABLE NON-MANDATORY MEETING RESOURCES TO OBTAIN A SATISFACTION SCORE FOR EACH POTENTIAL MEETING TIME OPERATION 215 could be combined into a single operation, being performed simultaneously, or in parallel, or the order of these operations could be reversed. Consequently, the order of operations discussed above does not limit the invention as claimed.

In one embodiment, once each of the potential meeting times identified/determined is further analyzed to determine the number of non-mandatory meeting resources also available at each of the potential meeting times and the sum of the importance ratings associated with the non-mandatory meeting resources also available at each of the potential meeting times is calculated to determine a satisfaction score for each of the potential meeting times at FOR EACH OF THE POTENTIAL MEETING TIMES DETERMINE THE AVAILABLE NON-MANDATORY MEETING RESOURCES ALSO AVAILABLE AND SUM THE IMPORTANCE RATINGS FOR THE AVAILABLE NON-MANDATORY MEETING RESOURCES TO OBTAIN A SATISFACTION SCORE FOR EACH POTENTIAL MEETING TIME OPERATION 215, process flow proceeds to PROVIDE THE USER A LISTING OF AT LEAST ONE POTENTIAL MEETING TIME ALONG WITH THE SATISFACTION SCORE FOR THE POTENTIAL MEETING TIME OPERATION 217.

In one embodiment, at PROVIDE THE USER A LISTING OF AT LEAST ONE POTENTIAL MEETING TIME ALONG WITH THE SATISFACTION SCORE FOR THE POTENTIAL MEETING TIME OPERATION 217 a listing including at least one potential meeting time when all the user identified mandatory meeting resources are available is provided and a satisfaction score for that potential meeting time is also provided.

In one embodiment, all potential meeting times are listed with their respective satisfaction score so the user can choose a meeting time from the entire list of meeting times that meet the mandatory requirements. In some embodiments, only a designated number of potential meeting times, typically those having the highest satisfaction scores, are listed. In some embodiments, only the potential meeting times having a satisfaction score equal to, or greater than, a pre-defined threshold satisfaction score are shown. In some embodiments, only the potential meeting time having the highest satisfaction score is shown. In one embodiment, a user can select a potential meeting time by interacting and/or activating a listed potential meeting time through a user interface and/or a user interface device such as any of those discussed herein. In one embodiment, the potential meeting time having the highest satisfaction score is automatically chosen as the meeting time and the mandatory and available non-mandatory meeting resources are automatically reserved.

FIG. 6 is a representation of an exemplary listing of potential meeting times 600 in accordance with one embodiment.

As seen in FIG. 6, listing of potential meeting times 600 includes: potential meeting times listed as rows 601; date column 603 showing the date of each potential meeting time; time column 605 showing the potential meeting time on the date of date column 603; room column 607 showing, if applicable, the conference room available at the potential meeting time; and satisfaction score column 609 indicating the satisfaction score of the potential meeting time out of the total possible score. In the specific example of FIG. 6, the potential meeting times 601 are listed in descending order by satisfaction score, with the highest satisfaction score potential meeting time being listed closest to the top of the display. However, in other embodiments, other listing orders, such as by date, can be accommodated.

FIG. 6 shows a specific example of a listing of potential meeting times 600. Those of skill in the art will readily recognize that the choice of information displayed, the organization of the information displayed, and the manner in which the information is displayed was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information are possible, and that the specific means discussed above do not limit the invention as set forth in the claims below.

In addition, FIG. 6 shows a specific example of listing of potential meeting times 600 as it might be displayed on a computing system display. However, listing of potential meeting times 600 can take other forms in other embodiments such as, but not limited to: printed forms; displays on a portable computer, a workstation, a two-way pager, a cellular telephone, a smart phone, a digital wireless telephone, a personal digital assistant, a server computer, an Internet appliance, or any other device that includes components capable of processing computer readable data, whether known at the time of filing or as developed later; attachments to e-mails; and/or any other form of text or text display capable of conveying information whether known at the time of filing or as developed later.

In one embodiment, once the user is provided with a listing including at least one potential meeting time when all the user identified mandatory meeting resources are available and a satisfaction score for that potential meeting time is also provided at PROVIDE THE USER A LISTING OF AT LEAST ONE POTENTIAL MEETING TIME ALONG WITH THE SATISFACTION SCORE FOR THE POTENTIAL MEETING TIME OPERATION 217, process flow proceeds to END OPERATION 230 and process for relational scheduling of resources 200 is exited.

Using process for relational scheduling of resources 200, the capability to determine meeting times when not only all mandatory meeting resources are available but also when the importance rating for all non-mandatory resources desired is maximized is provided. As a result, a user of process for relational scheduling of resources 200 is given the capability to determine and schedule the "best" meeting time in terms of desired resources and capabilities.

In accordance with one embodiment, a process for relational scheduling of people provides a user desiring to schedule a meeting with the ability to enter meeting request data. In one embodiment, the meeting request data includes, but is not limited to: designated participants desired for the meeting and an importance rating/score for at least one desired participant, including, in one embodiment, the ability to designate a given participant as mandatory. In one embodiment, the meeting request data also includes one or more meeting scheduling criteria such as, but not limited to, a meeting length and a meeting date and/or time frame or meeting "date window", within which the meeting is to take place. In one embodiment, the meeting request data is then used to search participant availability data to determine one or more meeting times within the user defined meeting scheduling criteria that provides both the mandatory meeting requirements and maximizes the sum of the non-mandatory participant rating/scores for the meeting.

FIG. 7 a flow chart depicting a process for relational scheduling of people 700 in accordance with one embodiment. Process for relational scheduling of people 700 begins at ENTER OPERATION 701 of FIG. 7 and process flow proceeds to OBTAIN MEETING PARTICIPANT CALENDAR DATA INCLUDING DATA REPRESENTING ONE OR MORE POTENTIAL MEETING PARTICIPANTS, THE LOCATION OF THE ONE OR MORE POTENTIAL MEETING PARTICIPANTS, AND THE AVAILABILITY OF THE ONE OR MORE POTENTIAL MEETING PARTICIPANTS OPERATION 706.

In one embodiment, at OBTAIN MEETING PARTICIPANT CALENDAR DATA INCLUDING DATA REPRESENTING ONE OR MORE POTENTIAL MEETING PARTICIPANTS, THE LOCATION OF THE ONE OR MORE POTENTIAL MEETING PARTICIPANTS, AND THE AVAILABILITY OF THE ONE OR MORE POTENTIAL MEETING PARTICIPANTS OPERATION 706, potential participant calendar data, such as, but not limited to, individual participant availability and/or appointment and/or location data is obtained.

In one embodiment, the potential participant calendar data is obtained from a computing system implemented calendar and/or appointment management system, such as calendar and/or appointment management systems 180 and/or 190 in FIG. 1. As used herein, the term computing system implemented calendar and/or appointment management system and the term calendar and/or appointment management system are used interchangeable to denote any computing system implemented process, application, module, program, component of a software system, component of a software package, component of a parent system, plug-in, or a feature of a parent system, whereby a user can process, track and/or display meeting participant calendar data such as, but not limited to, the availability of potential meeting participants. In one embodiment, the computing system implemented calendar and/or appointment management system is a module and/or feature of a parent computing system implemented application that can, as an example, provide the user the ability to contact meeting participants and/or determine future availability of meeting participants. As noted above several calendar and/or appointment management systems are currently available and are well known to those of skill in the art.

In one embodiment, the potential participant calendar data is collected by manually entering the data into a computing system, such as computing systems 100, 153 and/or server system 120, of FIG. 1 using a user interface device such as a keyboard, such as keyboards 107, 157, a mouse, such as mice 111, 161, a touch pad, voice recognition software, or any other device capable of providing user input to a computing system and/or for translating user actions into computing system operations, whether known at the time of filing or as developed later. In one embodiment, the potential participant calendar data is collected by entering the data into a computing system using a data entry form and/or interface.

In one embodiment, once potential participant calendar data such as, but not limited to, data denoting the meeting participants, data representing the meeting participants locations and data representing the availability of the participants is collected, the potential participant calendar data is stored, remotely or locally, in whole, or in part, in a database, such as database 170 in FIG. 1, maintained by, accessible by, owned by, or otherwise related to, a provider of process for relational scheduling of people 700 and/or the user, and/or any third party, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memories 103A, 153A of FIG. 1, or in any main memory or mass memory, associated with a computing device, such as computing systems 100, 150 described above. In one embodiment, the data, in whole, or in part, is stored in any computing device and/or server system, such as computing systems 100, 150 and/or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 7, in some embodiments, the data stored as described above is maintained, in whole, or in part, locally or remotely, by: the provider of process for relational scheduling of people 700; the user; a third party data storage institution; any third party service or institution; or any other parties.

In one embodiment, once the potential participant calendar data is obtained and stored at OBTAIN MEETING PARTICIPANT CALENDAR DATA INCLUDING DATA REPRESENTING ONE OR MORE POTENTIAL MEETING PARTICIPANTS, THE LOCATION OF THE ONE OR MORE POTENTIAL MEETING PARTICIPANTS, AND THE AVAILABILITY OF THE ONE OR MORE POTENTIAL MEETING PARTICIPANTS OPERATION 706 process flow proceeds to PROVIDE A USER MEETING REQUEST FORM/INTERFACE OPERATION 707.

In one embodiment, at PROVIDE A USER MEETING REQUEST FORM/INTERFACE OPERATION 707, a user wishing to schedule a meeting is provided with a meeting request form/interface for entering meeting request data that will be used to find optimized meeting times when mandatory meeting participants are available and important non-mandatory meeting participants are also available.

FIG. 8 is a representation of an exemplary meeting request entry form/interface 800 for entering meeting request data in accordance with one embodiment. In one embodiment, meeting request entry form/interface 800 is a hardcopy form. In one embodiment, meeting request entry form/interface 800 is an electronic form displayed on a display device, such as display devices 115, 165, 125 of computing systems 100, 151 and/or server system 120 of FIG. 1. In one embodiment, meeting request entry form/interface 800 is an electronic user interface displayed on a display device, such as display devices 115, 165, 125 of computing systems 100, 151 and/or server system 120 of FIG. 1.

Returning to FIG. 8, in one embodiment, meeting request entry form/interface 800 includes: date window field 801; day of week window field 803; time window field 805; length of meeting field 807; number of attendees field 809; desired participants listing 811, including desired participant name fields 813, desired participant e-mail fields 814, desired participant importance rating field 815, and mandatory designation fields 817.

In the specific example shown in FIG. 8, meeting request entry form/interface 800 includes date window field 801 where a user can enter a range or "window" of dates when the meeting is to take place. The date window will determine the time frame that process for relational scheduling of people 700 (FIG. 7) will use to conduct its search as discussed below. In one embodiment, date window field 801 (FIG. 8) allows the user to designate the earliest date on which the meeting is to occur and the latest date on which the meeting may occur. This feature allows the user to leave time for meeting preparation, or for prerequisite events to occur, and to ensure any deadlines for the meeting are met. In other embodiments, a user enters a latest date on which the meeting can take place and the present date is assumed to be the beginning date or earliest date. In other embodiments, the user enters an earliest date for the meeting a window is created for a predetermined future time frame such as two weeks.

In the specific example shown in FIG. 8, meeting request entry form/interface 800 includes day of week window field 803 where a user can designate the days of the week on which the meeting can take place. Day of week window field 803 allows the user to designate specific day(s) of the week for the meeting. This allows the user to avoid scheduling the meeting on particularly busy weekdays, like Monday of Fridays, and/or impractical days such as weekends. In one embodiment, day of week window field 803 includes a pull-down menu and/or listing of days of the week for the user to chose.

In the specific example shown in FIG. 8, meeting request entry form/interface 800 includes length of meeting field 807 where a user designates the length of the meeting. In one embodiment, length of meeting field 807 allows the user to choose the unit of time, such as minutes or hours, from a pull-down menu and/or listing of units of time.

In the specific example shown in FIG. 8, meeting request entry form/interface 800 includes number of attendees field 809 where a user can designate the number of attendees of the meeting. In one embodiment, number of attendees field 809 includes a minimum and maximum number so that scheduling alternatives can be considered.

In the specific example shown in FIG. 8, meeting request entry form/interface 800 includes desired participants listing 811. In one embodiment, desired participants listing 811 includes desired participant name fields 813 where the user enters the desired meeting participant's names. In one embodiment, desired participants listing 811 includes desired participant e-mail fields 814 where the e-mail address for the desired participants are entered and/or pulled into meeting request entry form/interface 800.

In one embodiment, desired participants listing 811 includes desired participant importance rating fields 815 and mandatory designation fields 817. In one embodiment, desired participant importance rating fields 815 and mandatory designation fields 817 are each associated with a specific meeting participant listed in desired participant name fields 813. According to one embodiment, any meeting participant desired by the user is given an importance rating and/or mandatory status. In some embodiments, if the importance rating is not provided, the meeting participant desired is given a predetermined importance rating, such as, for example, an importance rating score of zero. In the specific example shown in FIG. 8, the user is given the choice of either designating a given desired meeting participant as mandatory, for instance see participant Phil McKay and exemplary mandatory designation field 817A, or giving a given desired meeting participant a non-mandatory importance rating/score, for instance see participant Joe Smith and exemplary importance rating field 815A. As discussed below, process for relational scheduling of people 700 (FIG. 7) uses this information to ensure all mandatory meeting participants are available and to maximize the sum of the importance ratings/scores.

Returning to FIG. 8, while in the specific example of meeting request entry form/interface 800 shown in FIG. 8 separate desired participant importance rating fields 815 and mandatory designation fields 817 are shown, in other embodiments, a given meeting participant is designated mandatory by assigning a particular importance score. In one instance, the importance score indicating mandatory status can be a pre-defined score. In other instances, the importance score indicating mandatory status is a score that is greater than all other scores when summed. In addition, while in the specific example of meeting request entry form/interface 800 shown in FIG. 8 a numerical value is shown as the importance rating/score, in other embodiments, the importance rating is provided using any of the mechanisms and/or symbols discussed herein and/or known in the art.

FIG. 8 shows a specific example of a meeting request entry form/interface. Those of skill in the art will readily recognize that the choice of information displayed, the organization of the information displayed, and the manner in which the information is displayed was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information are possible, and that the specific means discussed above do not limit the invention as set forth in the claims below.

In addition, FIG. 8 shows a specific example of meeting request entry form/interface 800 as it might be displayed on a computing system display. However, as noted above, meeting request entry form/interface 800 can take other forms in other embodiments such as, but not limited to: printed forms; displays on a portable computer, a workstation, a two-way pager, a cellular telephone, a smart phone, a digital wireless telephone, a personal digital assistant, a server computer, an Internet appliance, or any other device that includes components capable of processing computer readable data, whether known at the time of filing or as developed later; attachments to e-mails; and/or any other form of text or text display capable of conveying/accepting/entering information whether known at the time of filing or as developed later.

In one embodiment, once a user wishing to schedule a meeting is provided with a meeting request form/interface for entering meeting request data at PROVIDE A USER MEETING REQUEST FORM/INTERFACE OPERATION 707, process flow proceeds to A USER REQUESTS A MEETING THROUGH THE USER MEETING REQUEST FORM/INTERFACE AND PROVIDES MEETING REQUEST DATA INCLUDING MEETING SCHEDULING CRITERIA, ANY MANDATORY MEETING PARTICIPANTS, AND/OR ANY NON-MANDATORY MEETING PARTICIPANTS ALONG WITH AN IMPORTANCE RATING FOR AT LEAST ONE NON-MANDATORY MEETING PARTICIPANT DESIRED OPERATION 709.

In one embodiment, at A USER REQUESTS A MEETING THROUGH THE USER MEETING REQUEST FORM/INTERFACE AND PROVIDES MEETING REQUEST DATA INCLUDING MEETING SCHEDULING CRITERIA, ANY MANDATORY MEETING PARTICIPANTS, AND/OR ANY NON-MANDATORY MEETING PARTICI- PANTS ALONG WITH AN IMPORTANCE RATING FOR AT LEAST ONE NON-MANDATORY MEETING PARTICIPANT DESIRED OPERATION 709, a user enters meeting request data into process for relational scheduling of people 700 using a user interface device such as a keyboard, mouse, touchpad, or any other device capable of providing user input to a computing system and/or for translating user actions into computing system operations, as discussed herein, and/or known at the time of filing, and/or as developed later.

In one embodiment, the meeting request data includes meeting scheduling criteria such as, but not limited to: a time frame for the meeting including a date range when the meeting is to occur; the length of the meeting, i.e., how long the meeting will last; days of the week when the meeting may take place; times of day when the meeting may take place; the minimum and/or maximum number of attendees; etc. In one embodiment, the meeting request data also includes, but is not limited to: any meeting participants required for the meeting, i.e., all mandatory meeting participants; and any desired, but non-mandatory meeting participants, along with an importance rating for at least one of the non-mandatory participants. In one embodiment, the meeting request data is entered using the meeting request form/interface for entering meeting request data of PROVIDE A USER MEETING REQUEST FORM/INTERFACE OPERATION 707.

Returning to FIG. 8, meeting request entry form/interface 800 is shown as having been filled out by a user at A USER REQUESTS A MEETING THROUGH THE USER MEETING REQUEST FORM/INTERFACE AND PROVIDES MEETING REQUEST DATA INCLUDING MEETING SCHEDULING CRITERIA, ANY MANDATORY MEETING PARTICIPANTS, AND/OR ANY NON-MANDATORY MEETING PARTICIPANTS ALONG WITH AN IMPORTANCE RATING FOR AT LEAST ONE NON-MANDATORY MEETING PARTICIPANT DESIRED OPERATION 709 (FIG. 7).

As seen in FIG. 8, through meeting request entry form/interface 800, a user has entered meeting scheduling criteria including: a time frame for the meeting of Jan. 31, 2007 to Feb. 27, 2007 using date window field 801; that the meeting must take place during the work week and between 8 AM and 5 PM using day of week window field 803 and time window field 805; a meeting having a length of 90 minutes through length of meeting field 807; and the minimum number of attendees as 5 and the maximum as 10 using number of attendees field 809.

As also seen in FIG. 8, through meeting request entry form/interface 800, a user has requested 8 participants using desired participants listing 811, including desired participant name fields 813.

As also seen in FIG. 8, through meeting request entry form/interface 800, a user has indicated that the participants Phil McKay, Sean Lewis and George Patton are mandatory for the requested meeting by marking the mandatory designation fields 817 associated with these participants.

As also seen in FIG. 8, through meeting request entry form/interface 800, a user has given: Joe Smith an importance rating of 75; Jane Doe an importance rating of 50; Adam Ant an importance rating of 35; Van Halen an importance rating of 20; and Joe Fitz an importance rating of 0.

As noted above, FIG. 8 shows a specific example of a meeting request entry form/interface. Those of skill in the art will readily recognize that the choice of information displayed, the organization of the information displayed, and the manner in which the information is displayed was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information are possible, and that the specific means discussed above do not limit the invention as set forth in the claims below.

In addition, as discussed above, FIG. 8 shows a specific example of meeting request entry form/interface 800 as might be displayed on a computing system display. However, as noted above, meeting request entry form/interface 800 can take other forms in other embodiments such as, but not limited to: printed forms; displays on a portable computer, a workstation, a two-way pager, a cellular telephone, a smart phone, a digital wireless telephone, a personal digital assistant, a server computer, an Internet appliance, or any other device that includes components capable of processing computer readable data, whether known at the time of filing or as developed later; attachments to e-mails; and/or any other form of text or text display capable of conveying/entering information whether known at the time of filing or as developed later.

In one embodiment, once a user enters meeting request data into process for relational scheduling of people 700 (FIG. 7) at A USER REQUESTS A MEETING THROUGH THE USER MEETING REQUEST FORM/INTERFACE AND PROVIDES MEETING REQUEST DATA INCLUDING MEETING SCHEDULING CRITERIA, ANY MANDATORY MEETING PARTICIPANTS, AND/OR ANY NON-MANDATORY MEETING PARTICIPANTS ALONG WITH AN IMPORTANCE RATING FOR AT LEAST ONE NON-MANDATORY MEETING PARTICIPANT DESIRED OPERATION 709, process flow proceeds to ACCESS THE MEETING PARTICIPANT CALENDAR DATA OPERATION 711.

In one embodiment, at ACCESS THE MEETING PARTICIPANT CALENDAR DATA OPERATION 711 the potential participant calendar data obtained at OBTAIN MEETING PARTICIPANT CALENDAR DATA INCLUDING DATA REPRESENTING ONE OR MORE POTENTIAL MEETING PARTICIPANTS, THE LOCATION OF THE ONE OR MORE POTENTIAL MEETING PARTICIPANTS, AND THE AVAILABILITY OF THE ONE OR MORE POTENTIAL MEETING PARTICIPANTS OPERATION 706 and stored at STORE THE POTENTIAL PARTICIPANT CALENDAR DATA OPERATION 205 is accessed by process for relational scheduling of people 700.

In various embodiments, access to the potential participant calendar data is provided through any method, apparatus, process or mechanism for transferring and/or viewing data and/or text from one or more devices, computing systems, server systems, databases, web site/web functions and/or any devices having a data storage capability to and/or by one or more other devices, computing systems, server systems, databases, web site/web functions and/or any devices having a data storage capability, discussed herein, and/or known at the time of filing, and/or as thereafter developed.

In one embodiment, once the potential participant calendar data is accessed by process for relational scheduling of people 700 at ACCESS THE MEETING PARTICIPANT CALENDAR DATA OPERATION 711, process flow proceeds to USE THE MEETING PARTICIPANT CALENDAR DATA AND THE MEETING REQUEST DATA TO DETERMINE POTENTIAL MEETING TIMES WHEN ALL MANDATORY MEETING PARTICIPANTS ARE AVAILABLE OPERATION 713.

In one embodiment, at USE THE MEETING PARTICIPANT CALENDAR DATA AND THE MEETING REQUEST DATA TO DETERMINE POTENTIAL MEETING TIMES WHEN ALL MANDATORY MEETING PARTICIPANTS ARE AVAILABLE OPERATION 713, the meeting request data from A USER REQUESTS A MEETING THROUGH THE USER MEETING REQUEST FORM/INTERFACE AND PROVIDES MEETING REQUEST DATA INCLUDING MEETING SCHEDULING CRITERIA, ANY MANDATORY MEETING PARTICIPANTS, AND/OR ANY NON-MANDATORY MEETING PARTICIPANTS ALONG WITH AN IMPORTANCE RATING FOR AT LEAST ONE NON-MANDATORY MEETING PARTICIPANT DESIRED OPERATION 709 is used to search the potential participant calendar data of obtained at OBTAIN MEETING PARTICIPANT CALENDAR DATA INCLUDING DATA REPRESENTING ONE OR MORE POTENTIAL MEETING PARTICIPANTS, THE LOCATION OF THE ONE OR MORE POTENTIAL MEETING PARTICIPANTS, AND THE AVAILABILITY OF THE ONE OR MORE POTENTIAL MEETING PARTICIPANTS OPERATION 706 and accessed at ACCESS THE MEETING PARTICIPANT CALENDAR DATA OPERATION 711 to determine/find potential meeting times that meet all of the user entered criteria including the meeting time frame, meeting length and when all of the mandatory meeting participants are available.

In one embodiment, the meeting scheduling criteria the user entered as part of the meeting request data, i.e., the meeting time frame, meeting length, and any other user provided meeting scheduling criteria, such as specified days of the week and times of the day, are identified from the meeting request data. In one embodiment, the meeting participant availability data for each of the mandatory meeting participants is then searched to find times, within the user defined meeting scheduling criteria of the meeting request data, when all of the mandatory meeting participants are available. In one embodiment, each of the times when all of the mandatory meeting participants are available within the user defined meeting scheduling criteria is designated a potential meeting time.

Methods, processes, means and mechanisms for searching data, such as potential participant calendar data, using search parameter data, such as meeting request data, are well known to those of skill in the art. Consequently, a more detailed discussion of methods, processes, means, and mechanisms for searching data, such as potential participant calendar data, using search parameter data, such as meeting request data, is omitted here to avoid detracting from the invention.

In addition, those of skill in the art will readily recognize that the order of operations discussed above was presented for illustrative purposes only and that other orders of operations, and combination of operations, are possible. Consequently, the order of operations discussed above does not limit the invention as claimed.

Returning to FIG. 7, in one embodiment, once the potential participant calendar data is searched using the meeting request data and potential meeting times are identified/determined at USE THE MEETING PARTICIPANT CALENDAR DATA AND THE MEETING REQUEST DATA TO DETERMINE POTENTIAL MEETING TIMES WHEN ALL MANDATORY MEETING PARTICIPANTS ARE AVAILABLE OPERATION 713, process flow proceeds to FOR EACH OF THE POTENTIAL MEETING TIMES DETERMINE THE AVAILABLE NON-MANDATORY MEETING PARTICIPANTS ALSO AVAILABLE AND SUM THE IMPORTANCE RATINGS FOR THE AVAILABLE NON-MANDATORY MEETING PARTICIPANTS TO OBTAIN A SATISFACTION SCORE FOR EACH POTENTIAL MEETING TIME OPERATION 715.

In one embodiment, at FOR EACH OF THE POTENTIAL MEETING TIMES DETERMINE THE AVAILABLE NON-MANDATORY MEETING PARTICIPANTS ALSO AVAILABLE AND SUM THE IMPORTANCE RATINGS FOR THE AVAILABLE NON-MANDATORY MEETING PARTICIPANTS TO OBTAIN A SATISFACTION SCORE FOR EACH POTENTIAL MEETING TIME OPERATION 715, each of the potential meeting times identified/determined at USE THE MEETING PARTICIPANT CALENDAR DATA AND THE MEETING REQUEST DATA TO DETERMINE POTENTIAL MEETING TIMES WHEN ALL MANDATORY MEETING PARTICIPANTS ARE AVAILABLE OPERATION 713 is further analyzed to determine the number of non-mandatory meeting participants also available at each of the potential meeting times. Then, the sum of the importance ratings associated with the non-mandatory meeting participants also available at each of the potential meeting times is calculated to determine a total satisfaction rating/score for each of the potential meeting times.

In one embodiment, non-mandatory meeting participants and their associated importance ratings are obtained from the meeting request data entered by the user. Then, in one embodiment, the meeting participant availability data for each of the non-mandatory meeting participants is obtained and compared to the potential meeting times identified/determined at USE THE MEETING PARTICIPANT CALENDAR DATA AND THE MEETING REQUEST DATA TO DETERMINE POTENTIAL MEETING TIMES WHEN ALL MANDATORY MEETING PARTICIPANTS ARE AVAILABLE OPERATION 713.

In one embodiment, for each potential meeting time identified/determined at USE THE MEETING PARTICIPANT CALENDAR DATA AND THE MEETING REQUEST DATA TO DETERMINE POTENTIAL MEETING TIMES WHEN ALL MANDATORY MEETING PARTICIPANTS ARE AVAILABLE OPERATION 713, the number of available non-mandatory meeting participants also available at the potential meeting time is determined. Then, in one embodiment, the user entered importance ratings for each of the non-mandatory meeting participants available at the potential meeting time are summed. In one embodiment, the sum of the importance ratings for each potential meeting time is then designated a total satisfaction score for that potential meeting time.

Methods, processes, means and mechanisms for searching data, such as potential participant calendar data, using search parameter data, such as meeting request data, are well known to those of skill in the art. Consequently, a more detailed discussion of methods, processes, means, and mechanisms for searching data, such as potential participant calendar data, using search parameter data, such as meeting request data, is omitted here to avoid detracting from the invention.

Methods, processes, means and mechanisms for calculating sums and summing data, such as importance ratings data, are well known to those of skill in the art. Consequently, a more detailed discussion of methods, processes, means, and mechanisms for calculating sums and summing data, such as importance ratings data, is omitted here to avoid detracting from the invention.

In addition, those of skill in the art will readily recognize that the order of operations discussed above was presented for illustrative purposes only and that other orders of operations, and combination of operations, are possible. For example, in some embodiments the operations USE THE MEETING PARTICIPANT CALENDAR DATA AND THE MEETING REQUEST DATA TO DETERMINE POTENTIAL MEETING TIMES WHEN ALL MANDATORY MEETING PARTICIPANTS ARE AVAILABLE OPERATION 713 and FOR EACH OF THE POTENTIAL MEETING TIMES DETERMINE THE AVAILABLE NON-MANDATORY MEETING PARTICIPANTS ALSO AVAILABLE AND SUM THE IMPORTANCE RATINGS FOR THE AVAILABLE NON-MANDATORY MEETING PARTICIPANTS TO OBTAIN A SATISFACTION SCORE FOR EACH POTENTIAL MEETING TIME OPERATION 715 can be performed in a single operation, simultaneously, in parallel, or in reverse order. Consequently, the order of operations discussed above does not limit the invention as claimed.

In one embodiment, once each of the potential meeting times identified/determined is further analyzed to determine the number of non-mandatory meeting participants also available at each of the potential meeting times, and the sum of the importance ratings associated with the non-mandatory meeting participants also available at each of the potential meeting times is calculated to determine a satisfaction score for each of the potential meeting times at FOR EACH OF THE POTENTIAL MEETING TIMES DETERMINE THE AVAILABLE NON-MANDATORY MEETING PARTICIPANTS ALSO AVAILABLE AND SUM THE IMPORTANCE RATINGS FOR THE AVAILABLE NON-MANDATORY MEETING PARTICIPANTS TO OBTAIN A SATISFACTION SCORE FOR EACH POTENTIAL MEETING TIME OPERATION 715, process flow proceeds to PROVIDE THE USER A LISTING OF AT LEAST ONE POTENTIAL MEETING TIME ALONG WITH THE SATISFACTION SCORE FOR THE POTENTIAL MEETING TIME OPERATION 717.

In one embodiment, at PROVIDE THE USER A LISTING OF AT LEAST ONE POTENTIAL MEETING TIME ALONG WITH THE SATISFACTION SCORE FOR THE POTENTIAL MEETING TIME OPERATION 717 a listing including at least one potential meeting time when all the user identified mandatory meeting participants are available and a satisfaction score for that potential meeting time is provided.

In one embodiment, all potential meeting times are listed with their respective satisfaction score so the user can choose a meeting time for all of the potential meeting times. In some embodiments, only a designated number of potential meeting times, typically those having the highest satisfaction scores, are listed. In some embodiments, only the potential meeting times having a satisfaction score equal to, or greater than, a pre-defined threshold satisfaction score are shown. In some embodiments, only the potential meeting time having the highest satisfaction score is shown. In one embodiment, a user can select a potential meeting time by interacting and/or activating a listed potential meeting time through a user interface and/or a user interface device such as any of those discussed herein. In one embodiment, the potential meeting time having the highest satisfaction score is automatically chosen as the meeting time and the mandatory and available non-mandatory meeting participants are automatically invited and/or informed of the meeting, in one embodiment using the e-mails in participant e-mails fields 814 of FIG. 8.

FIG. 9 is a representation of an exemplary listing of potential meeting times 900 in accordance with one embodiment. As seen in FIG. 9, listing of potential meeting times 900 includes: potential meeting times listed as rows 901; date column 903 showing the date of the potential meeting time; time column 905 showing the potential meeting time on the date of date column 903; and satisfaction score column 909 indicating the satisfaction score of the potential meeting time out of the total possible score. In the specific example of FIG. 9, the potential meeting times 901 are listed in descending order by satisfaction score, with the highest satisfaction score potential meeting time being listed closest to the top of the display. However, in other embodiments, other listing orders, such as by date, can be accommodated.

FIG. 9 shows a specific example of a listing of potential meeting times 900. Those of skill in the art will readily recognize that the choice of information displayed, the organization of the information displayed, and the manner in which the information is displayed was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information are possible, and that the specific means discussed above do not limit the invention as set forth in the claims below.

In addition, FIG. 9 shows a specific example of listing of potential meeting times 900 as displayed on a computing system display. However, listing of potential meeting times 900 can take other forms in other embodiments such as, but not limited to: printed forms; displays on a portable computer, a workstation, a two-way pager, a cellular telephone, a smart phone, a digital wireless telephone, a personal digital assistant, a server computer, an Internet appliance, or any other device that includes components capable of processing computer readable data, whether known at the time of filing or as developed later; attachments to e-mails; and/or any other form of text or text display capable of conveying information whether known at the time of filing or as developed later.

In one embodiment, once the user is provided with a listing including at least one potential meeting time when all the user identified mandatory meeting participants are available and a satisfaction score for that potential meeting time is also provided at PROVIDE THE USER A LISTING OF AT LEAST ONE POTENTIAL MEETING TIME ALONG WITH THE SATISFACTION SCORE FOR THE POTENTIAL MEETING TIME OPERATION 717, process flow proceeds to END OPERATION 730 and process for relational scheduling of people 700 is exited.

Using process for relational scheduling of people 700 the capability to determine meeting times when not only all mandatory meeting participants are available, but also meeting times when the importance rating for all non-mandatory participants desired is maximized is provided. As a result, a user of process for relational scheduling of people 700 is given the capability to determine and schedule the "best" meeting time in terms of desired participants.

In accordance with one embodiment, a process for relational scheduling of people and resources provides a user desiring to schedule a meeting with the ability to enter meeting request data. In one embodiment, the meeting request data includes, but is not limited to: designated participants desired for the meeting and an importance rating/score for at least one desired participant, including, in one embodiment, the ability to designate a given participant as mandatory; and designated meeting resources desired for the meeting and an importance rating/score for at least one desired meeting resource, including, in one embodiment, the ability to designate a given meeting resource as mandatory. In one embodiment, the meeting request data also includes meeting scheduling criteria such as, but not limited to, a meeting length and a meeting date and/or time frame or meeting "date window", within which the meeting is to take place. In one embodiment, the meeting request data is then used to search participant and meeting resource availability data to determine one or more meeting times within the user defined meeting scheduling criteria that provides both the mandatory meeting requirements and maximizes the sum of the non-mandatory participant and meeting resource rating/scores for the meeting.

Figure 10:
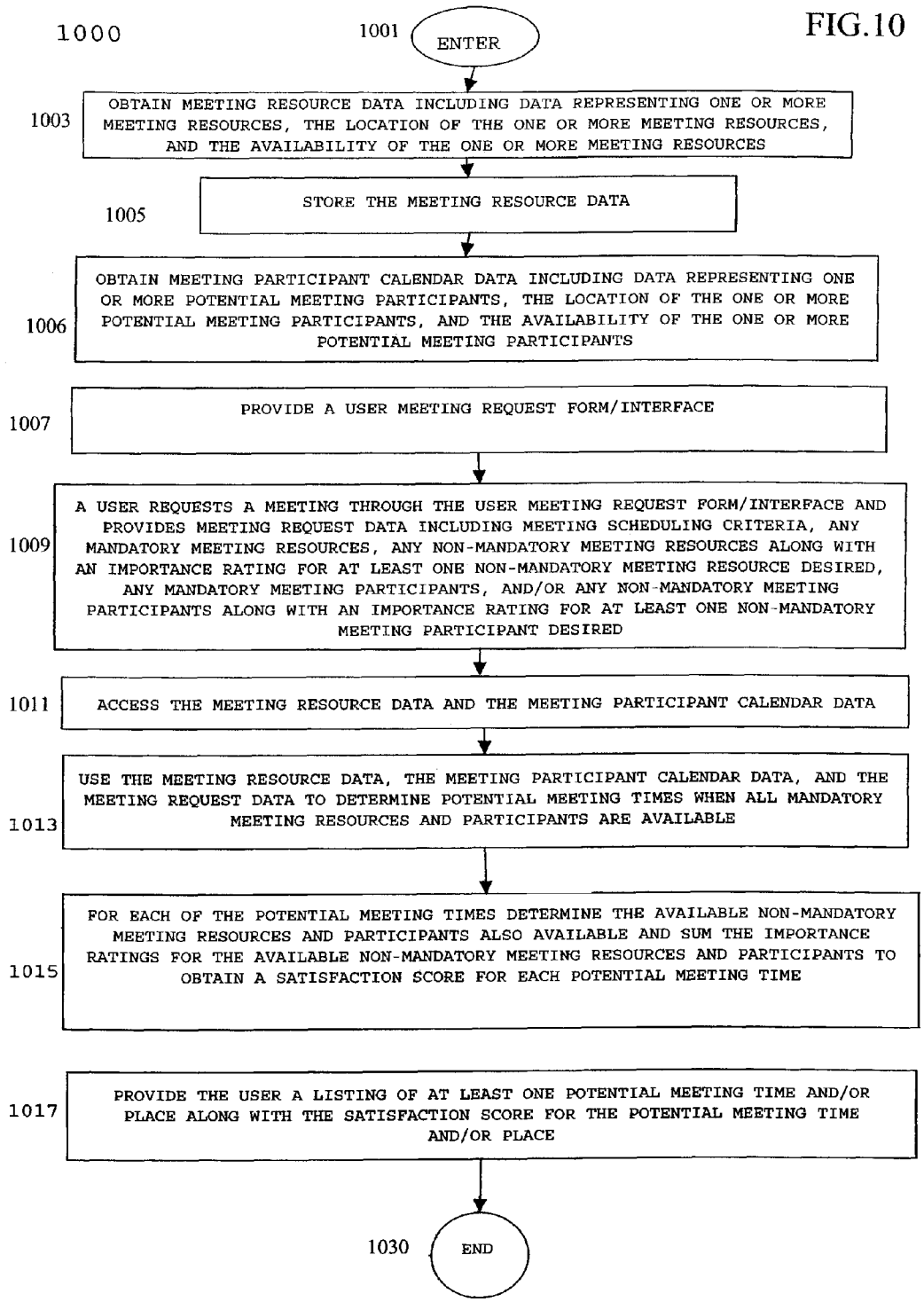
FIG. 10 is a flow chart depicting a process for relational scheduling of people and resources in accordance with one embodiment.

FIG. 10 a flow chart depicting a process for relational scheduling of people and resources 1000 in accordance with one embodiment. Process for relational scheduling of people and resources 1000 begins at ENTER OPERATION 1001 of FIG. 10 and process flow proceeds to OBTAIN MEETING RESOURCE DATA INCLUDING DATA REPRESENTING ONE OR MORE MEETING RESOURCES, THE LOCATION OF THE ONE OR MORE MEETING RESOURCES, AND THE AVAILABILITY OF THE ONE OR MORE MEETING RESOURCES OPERATION 1003.

In one embodiment, OBTAIN MEETING RESOURCE DATA INCLUDING DATA REPRESENTING ONE OR MORE MEETING RESOURCES, THE LOCATION OF THE ONE OR MORE MEETING RESOURCES, AND THE AVAILABILITY OF THE ONE OR MORE MEETING RESOURCES OPERATION 1003 and STORE THE MEETING RESOURCE DATA OPERATION 1005 of process for relational scheduling of people and resources 1000 are substantially identical to OBTAIN MEETING RESOURCE DATA INCLUDING DATA REPRESENTING ONE OR MORE MEETING RESOURCES, THE LOCATION OF THE ONE OR MORE MEETING RESOURCES, AND THE AVAILABILITY OF THE ONE OR MORE MEETING RESOURCES OPERATION 203 and STORE THE MEETING RESOURCE DATA OPERATION 205 of process for relational scheduling of resources 200 discussed above with respect to FIG. 2. Consequently, the discussion above with respect to OBTAIN MEETING RESOURCE DATA INCLUDING DATA REPRESENTING ONE OR MORE MEETING RESOURCES, THE LOCATION OF THE ONE OR MORE MEETING RESOURCES, AND THE AVAILABILITY OF THE ONE OR MORE MEETING RESOURCES OPERATION 203 and STORE THE MEETING RESOURCE DATA OPERATION 205 of FIG. 2 is applicable to, and incorporated here for, OBTAIN MEETING RESOURCE DATA INCLUDING DATA REPRESENTING ONE OR MORE MEETING RESOURCES, THE LOCATION OF THE ONE OR MORE MEETING RESOURCES, AND THE AVAILABILITY OF THE ONE OR MORE MEETING RESOURCES OPERATION 1003 and STORE THE MEETING RESOURCE DATA OPERATION 1005 of process for relational scheduling of people and resources 1000 in FIG. 10.

In addition, OBTAIN MEETING PARTICIPANT CALENDAR DATA INCLUDING DATA REPRESENTING ONE OR MORE POTENTIAL MEETING PARTICIPANTS, THE LOCATION OF THE ONE OR MORE POTENTIAL MEETING PARTICIPANTS, AND THE AVAILABILITY OF THE ONE OR MORE POTENTIAL MEETING PARTICIPANTS OPERATION 1006 of process for relational scheduling of people and resources 1000 is substantially identical to OBTAIN MEETING PARTICIPANT CALENDAR DATA INCLUDING DATA REPRESENTING ONE OR MORE POTENTIAL MEETING PARTICIPANTS, THE LOCATION OF THE ONE OR MORE POTENTIAL MEETING PARTICIPANTS, AND THE AVAILABILITY OF THE ONE OR MORE POTENTIAL MEETING PARTICIPANTS OPERATION 706 of process for relational scheduling of people 700 discussed above with respect to FIG. 7. Consequently, the discussion above with respect to OBTAIN MEETING PARTICIPANT CALENDAR DATA INCLUDING DATA REPRESENTING ONE OR MORE POTENTIAL MEETING PARTICIPANTS, THE LOCATION OF THE ONE OR MORE POTENTIAL MEETING PARTICIPANTS, AND THE AVAILABILITY OF THE ONE OR MORE POTENTIAL MEETING PARTICIPANTS OPERATION 706 of process for relational scheduling of people 700 of FIG. 7 is applicable to, and incorporated here for, OBTAIN MEETING PARTICIPANT CALENDAR DATA INCLUDING DATA REPRESENTING ONE OR MORE POTENTIAL MEETING PARTICIPANTS, THE LOCATION OF THE ONE OR MORE POTENTIAL MEETING PARTICIPANTS, AND THE AVAILABILITY OF THE ONE OR MORE POTENTIAL MEETING PARTICIPANTS OPERATION 1006 of process for relational scheduling of people and resources 1000.

In one embodiment, once the potential participant calendar data is obtained and stored at OBTAIN MEETING PARTICIPANT CALENDAR DATA INCLUDING DATA REPRESENTING ONE OR MORE POTENTIAL MEETING PARTICIPANTS, THE LOCATION OF THE ONE OR MORE POTENTIAL MEETING PARTICIPANTS, AND THE AVAILABILITY OF THE ONE OR MORE POTENTIAL MEETING PARTICIPANTS OPERATION 1006 process flow proceeds to PROVIDE A USER MEETING REQUEST FORM/INTERFACE OPERATION 1007.

In one embodiment, at PROVIDE A USER MEETING REQUEST FORM/INTERFACE OPERATION 1007, a user wishing to schedule a meeting is provided with a meeting request form/interface for entering meeting request data that will be used to find optimized meeting times when mandatory meeting participants and resources are available and important non-mandatory meeting participants and resources are also available.

FIG. 11 is a representation of an exemplary meeting request entry form/interface 1100 for entering meeting request data in accordance with one embodiment. In one embodiment, meeting request entry form/interface 1100 is a hardcopy form. In one embodiment, meeting request entry form/interface 1100 is an electronic form displayed on a display device, such as display devices 115, 165, 125 of computing systems 100, 151 and/or server system 120 of FIG. 1. In one embodiment, meeting request entry form/interface 1100 is an electronic user interface displayed on a display device, such as display devices 115, 165, 125 of computing systems 100, 151 and/or server system 120 of FIG. 1.

Returning to FIG. 11, in one embodiment, meeting request entry form/interface 1100 includes: date window field 1101; day of week window field 1103; time window field 1105; length of meeting field 1107; number of attendees field 1109; desired participants listing 1111, including desired participant name fields 1113, desired participant e-mail fields 1114, desired participant importance rating field 1115, and mandatory designation fields 1117; and equipment/capabilities desired listing 1131, including meeting resources listing 1133, importance fields 1135, and mandatory designation fields 1137.

In the specific example shown in FIG. 11, meeting request entry form/interface 1100 includes meeting scheduling criteria field such as: date window field 1101 where a user can enter a range or "window" of dates when the meeting is to take place; day of week window field 1103 where a user can designate the days of the week on which the meeting can take place; length of meeting field 1107 where a user designates the length of the meeting; and number of attendees field 1109 where a user can designate the number of attendees of the meeting.

In the specific example shown in FIG. 11, meeting request entry form/interface 1100 includes desired participants listing 1111. In one embodiment, desired participants listing 1111 is substantially identical to desired participants listing 811 of meeting request entry form/interface 800 of FIG. 8. Consequently the discussion with respect to desired participants listing 811 of FIG. 8 is applicable to, and incorporated here for, similarly labeled and identified elements of desired participants listing 1111 of meeting request entry form/interface 1100 and FIG. 11.

In the specific example shown in FIG. 11, meeting request entry form/interface 1100 includes equipment/capabilities desired listing 1131. In one embodiment, equipment/capabilities desired listing 1131 is substantially identical to equipment/capabilities desired listing 511 of meeting request entry form/interface 500 and FIG. 5. Consequently the discussion with respect to equipment/capabilities desired listing 511 of FIG. 5 is applicable to, and incorporated here for, similarly labeled and identified elements of equipment/capabilities desired listing 1131 of meeting request entry form/interface 1100 and FIG. 11.

FIG. 11 shows a specific example of a meeting request entry form/interface. Those of skill in the art will readily recognize that the choice of information displayed, the organization of the information displayed, and the manner in which the information is displayed was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information are possible, and that the specific means discussed above do not limit the invention as set forth in the claims below.

In addition, as discussed above, FIG. 11 shows a specific example of meeting request entry form/interface 1100 as it might be displayed on a computing system display. However, as noted above, meeting request entry form/interface 1100 can take other forms in other embodiments such as, but not limited to: printed forms; displays on a portable computer, a workstation, a two-way pager, a cellular telephone, a smart phone, a digital wireless telephone, a personal digital assistant, a server computer, an Internet appliance, or any other device that includes components capable of processing computer readable data, whether known at the time of filing or as developed later; attachments to e-mails; and/or any other form of text or text display capable of conveying/accepting/entering information whether known at the time of filing or as developed later.

In one embodiment, once a user wishing to schedule a meeting is provided with a meeting request form/interface for entering meeting request data at PROVIDE A USER MEETING REQUEST FORM/INTERFACE OPERATION 1007, process flow proceeds to A USER REQUESTS A MEETING THROUGH THE USER MEETING REQUEST FORM/INTERFACE AND PROVIDES MEETING REQUEST DATA INCLUDING MEETING SCHEDULING CRITERIA, ANY MANDATORY MEETING RESOURCES, ANY NON-MANDATORY MEETING RESOURCES ALONG WITH AN IMPORTANCE RATING FOR AT LEAST ONE NON-MANDATORY MEETING RESOURCE DESIRED, ANY MANDATORY MEETING PARTICIPANTS, AND/OR ANY NON-MANDATORY MEETING PARTICIPANTS ALONG WITH AN IMPORTANCE RATING FOR AT LEAST ONE NON-MANDATORY MEETING PARTICIPANT DESIRED OPERATION 1009.

In one embodiment, at A USER REQUESTS A MEETING THROUGH THE USER MEETING REQUEST FORM/INTERFACE AND PROVIDES MEETING REQUEST DATA INCLUDING MEETING SCHEDULING CRITERIA, ANY MANDATORY MEETING RESOURCES, ANY NON-MANDATORY MEETING RESOURCES ALONG WITH AN IMPORTANCE RATING FOR AT LEAST ONE NON-MANDATORY MEETING RESOURCE DESIRED, ANY MANDATORY MEETING PARTICIPANTS, AND/OR ANY NON-MANDATORY MEETING PARTICIPANTS ALONG WITH AN IMPORTANCE RATING FOR AT LEAST ONE NON-MANDATORY MEETING PARTICIPANT DESIRED OPERATION 1009, a user enters meeting request data into a computing system and/or process for relational scheduling of people and resources 1000 using a user interface device such as a keyboard, mouse, touchpad, or any other device capable of providing user input to a computing system or for translating user actions into computing system operations, as discussed herein and/or known at the time of filing or as developed later.

In one embodiment, the meeting request data includes meeting scheduling criteria such as, but not limited to: a time frame for the meeting including a date range when the meeting is to occur; the length of the meeting, i.e., how long the meeting will last; days of the week on which the meeting may take place; time of day when the meeting may take place; the minimum and/or maximum number of attendees; etc. In one embodiment, the meeting request data also includes, but is not limited to: any meeting participants required for the meeting, i.e., all mandatory meeting participants; any desired, but non-mandatory meeting participants, along with an importance rating for one or more non-mandatory participants; any meeting resources required for the meeting, i.e., all mandatory meeting resources; and any desired, but non-mandatory meeting resources, along with an importance rating for one or more non-mandatory resources. In one embodiment, the meeting request data is entered using the meeting request form/interface for entering meeting request data of PROVIDE A USER MEETING REQUEST FORM/INTERFACE OPERATION 1007.

In one embodiment, once a user enters meeting request data into process for relational scheduling of people and resources 1000 at A USER REQUESTS A MEETING THROUGH THE USER MEETING REQUEST FORM/INTERFACE AND PROVIDES MEETING REQUEST DATA INCLUDING MEETING SCHEDULING CRITERIA, ANY MANDATORY MEETING RESOURCES, ANY NON-MANDATORY MEETING RESOURCES ALONG WITH AN IMPORTANCE RATING FOR AT LEAST ONE NON-MANDATORY MEETING RESOURCE DESIRED, ANY MANDATORY MEETING PARTICIPANTS, AND/OR ANY NON-MANDATORY MEETING PARTICIPANTS ALONG WITH AN IMPORTANCE RATING FOR AT LEAST ONE NON-MANDATORY MEETING PARTICIPANT DESIRED OPERATION 1009, process flow proceeds to ACCESS THE MEETING RESOURCE DATA AND THE MEETING PARTICIPANT CALENDAR DATA OPERATION 1011.

In one embodiment, at ACCESS THE MEETING RESOURCE DATA AND THE MEETING PARTICIPANT CALENDAR DATA OPERATION 1011 the potential participant calendar data obtained at OBTAIN MEETING PARTICIPANT CALENDAR DATA INCLUDING DATA REPRESENTING ONE OR MORE POTENTIAL MEETING PARTICIPANTS, THE LOCATION OF THE ONE OR MORE POTENTIAL MEETING PARTICIPANTS, AND THE AVAILABILITY OF THE ONE OR MORE POTEN- TIAL MEETING PARTICIPANTS OPERATION 1006 and the meeting resource data obtained at OBTAIN MEETING RESOURCE DATA INCLUDING DATA REPRESENTING ONE OR MORE MEETING RESOURCES, THE LOCATION OF THE ONE OR MORE MEETING RESOURCES, AND THE AVAILABILITY OF THE ONE OR MORE MEETING RESOURCES OPERATION 1003 is accessed by process for relational scheduling of people and resources 1000.

In various embodiments, access to the potential participant calendar data is provided through any method, apparatus, process or mechanism for transferring and/or viewing data and/or text from one or more devices, computing systems, server systems, databases, web site/web functions and/or any devices having a data storage capability to and/or by one or more other devices, computing systems, server systems, databases, web site/web functions and/or any devices having a data storage capability, discussed herein, and/or known at the time of filing, and/or as thereafter developed.

In one embodiment, once the potential participant calendar data and the meeting resource data is accessed by process for relational scheduling of people and resources 1000 at ACCESS THE MEETING RESOURCE DATA AND THE MEETING PARTICIPANT CALENDAR DATA OPERATION 1011, process flow proceeds to USE THE MEETING RESOURCE DATA, THE MEETING PARTICIPANT CALENDAR DATA, AND THE MEETING REQUEST DATA TO DETERMINE POTENTIAL MEETING TIMES WHEN ALL MANDATORY MEETING RESOURCES AND PARTICIPANTS ARE AVAILABLE OPERATION 1013.

In one embodiment, at USE THE MEETING RESOURCE DATA, THE MEETING PARTICIPANT CALENDAR DATA, AND THE MEETING REQUEST DATA TO DETERMINE POTENTIAL MEETING TIMES WHEN ALL MANDATORY MEETING RESOURCES AND PARTICIPANTS ARE AVAILABLE OPERATION 1013, the meeting request data is used to search the potential participant calendar data and the meeting resource data to determine/find potential meeting times that meet all of the user entered criteria including the meeting time frame, meeting length and when all of the mandatory meeting participants and resources are available.

Methods, processes, means and mechanisms for searching data are well known to those of skill in the art. Consequently, a more detailed discussion of methods, processes, means, and mechanisms for searching data, such as potential participant calendar data and meeting resource data, using search parameter data, such as meeting request data, is omitted here to avoid detracting from the invention.

Returning to FIG. 10, in one embodiment, once the potential participant calendar data and meeting resource data is searched using the meeting request data and potential meeting times are identified/determined at USE THE MEETING RESOURCE DATA, THE MEETING PARTICIPANT CALENDAR DATA, AND THE MEETING REQUEST DATA TO DETERMINE POTENTIAL MEETING TIMES WHEN ALL MANDATORY MEETING RESOURCES AND PARTICIPANTS ARE AVAILABLE OPERATION 1013, process flow proceeds to FOR EACH OF THE POTENTIAL MEETING TIMES DETERMINE THE AVAILABLE NON-MANDATORY MEETING RESOURCES AND PARTICIPANTS ALSO AVAILABLE AND SUM THE IMPORTANCE RATINGS FOR THE AVAILABLE NON-MANDATORY MEETING RESOURCES AND PARTICIPANTS TO OBTAIN A SATISFACTION SCORE FOR EACH POTENTIAL MEETING TIME OPERATION 1015.

In one embodiment, at FOR EACH OF THE POTENTIAL MEETING TIMES DETERMINE THE AVAILABLE NON-MANDATORY MEETING RESOURCES AND PARTICIPANTS ALSO AVAILABLE AND SUM THE IMPORTANCE RATINGS FOR THE AVAILABLE NON-MANDATORY MEETING RESOURCES AND PARTICIPANTS TO OBTAIN A SATISFACTION SCORE FOR EACH POTENTIAL MEETING TIME OPERATION 1015, each of the potential meeting times identified/determined at USE THE MEETING RESOURCE DATA, THE MEETING PARTICIPANT CALENDAR DATA, AND THE MEETING REQUEST DATA TO DETERMINE POTENTIAL MEETING TIMES WHEN ALL MANDATORY MEETING RESOURCES AND PARTICIPANTS ARE AVAILABLE OPERATION 1013 is further analyzed to determine the number of non-mandatory meeting participants and non-mandatory meeting resources also available at each of the potential meeting times. Then, in one embodiment, the sum of the importance ratings associated with the non-mandatory meeting participants and non-mandatory meeting resources also available at each of the potential meeting times is calculated to determine a total satisfaction rating/score for each of the potential meeting times.

Methods, processes, means and mechanisms for searching data using search parameter data are well known to those of skill in the art. Consequently, a more detailed discussion of methods, processes, means, and mechanisms for searching data, such as potential participant calendar data and meeting resource data, using search parameter data, such as meeting request data, is omitted here to avoid detracting from the invention.

Methods, processes, means and mechanisms for calculating sums and summing data, such as importance ratings data, are well known to those of skill in the art. Consequently, a more detailed discussion of methods, processes, means, and mechanisms for calculating sums and summing data, such as importance ratings data, is omitted here to avoid detracting from the invention.

In addition, those of skill in the art will readily recognize that the order of operations discussed above was presented for illustrative purposes only and that other orders of operations, and combination of operations, are possible. For example the operations USE THE MEETING RESOURCE DATA, THE MEETING PARTICIPANT CALENDAR DATA, AND THE MEETING REQUEST DATA TO DETERMINE POTENTIAL MEETING TIMES WHEN ALL MANDATORY MEETING RESOURCES AND PARTICIPANTS ARE AVAILABLE OPERATION 1013 and FOR EACH OF THE POTENTIAL MEETING TIMES DETERMINE THE AVAILABLE NON-MANDATORY MEETING RESOURCES AND PARTICIPANTS ALSO AVAILABLE AND SUM THE IMPORTANCE RATINGS FOR THE AVAILABLE NON-MANDATORY MEETING RESOURCES AND PARTICIPANTS TO OBTAIN A SATISFACTION SCORE FOR EACH POTENTIAL MEETING TIME OPERATION 1015 can, in other embodiments, be combined into a single operation, be performed simultaneously, be performed in parallel, or be performed in reverse order. Consequently, the order of operations discussed above does not limit the invention as claimed.

In one embodiment, once each of the potential meeting times identified/determined is further analyzed to determine a satisfaction score for each of the potential meeting times at FOR EACH OF THE POTENTIAL MEETING TIMES DETERMINE THE AVAILABLE NON-MANDATORY MEETING RESOURCES AND PARTICIPANTS ALSO AVAILABLE AND SUM THE IMPORTANCE RATINGS FOR THE AVAILABLE NON-MANDATORY MEETING RESOURCES AND PARTICIPANTS TO OBTAIN A SATISFACTION SCORE FOR EACH POTENTIAL MEETING TIME OPERATION 1015, process flow proceeds to PROVIDE THE USER A LISTING OF AT LEAST ONE POTENTIAL MEETING TIME ALONG WITH THE SATISFACTION SCORE FOR THE POTENTIAL MEETING TIME OPERATION 1017.

In one embodiment, at PROVIDE THE USER A LISTING OF AT LEAST ONE POTENTIAL MEETING TIME ALONG WITH THE SATISFACTION SCORE FOR THE POTENTIAL MEETING TIME OPERATION 1017 a listing including at least one potential meeting time when all the user identified mandatory meeting participants and resources are available and a satisfaction score for that potential meeting time is provided.

In one embodiment, all potential meeting times are listed with their respective satisfaction score so the user can choose a meeting time form all the potential meeting times. In some embodiments, only a designated number of potential meeting times, typically those having the highest satisfaction scores, are listed. In some embodiments, only the potential meeting times having a satisfaction score equal to, or greater than, a pre-defined threshold satisfaction score are shown. In some embodiments, only the potential meeting time having the highest satisfaction score is shown. In some embodiments, a user can select a potential meeting time by interacting and/or activating a listed potential meeting time through a user interface and/or a user interface device such as any of those discussed herein. In one embodiment, the potential meeting time having the highest satisfaction score is automatically chosen as the meeting time and the mandatory and available non-mandatory meeting participants are automatically invited and/or informed of the meeting and the mandatory and non-mandatory meeting resources are reserved.

Figure 12:
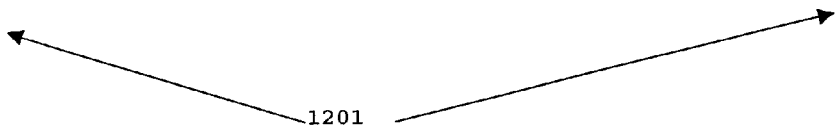
FIG. 12 is a representation of an exemplary listing of potential meeting times and the total satisfaction rating/score for each potential meeting time in accordance with one embodiment.

FIG. 12 is a representation of an exemplary listing of potential meeting times 1200 in accordance with one embodiment. As seen in FIG. 12, listing of potential meeting times 1200 includes: potential meeting times listed as rows 1201; date column 1203 showing the date of the potential meeting time; time column 1205 showing the potential meeting time on the date of date column 1203; room column showing the available conference room, if applicable; and satisfaction score column 1209 indicating the satisfaction score of the potential meeting time out of the total possible score. In the specific example of FIG. 12, the potential meeting times 1201 are listed in descending order by satisfaction score, with the highest satisfaction score being listed closest to the top of the display. However, in other embodiments, other listing orders, such as by date, can be accommodated.

FIG. 12 shows a specific example of a listing of potential meeting times 1200. Those of skill in the art will readily recognize that the choice of information displayed, the organization of the information displayed, and the manner in which the information is displayed was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information are possible, and that the specific means discussed above do not limit the invention as set forth in the claims below.

In addition, FIG. 12 shows a specific example of listing of potential meeting times 1200 as it might be displayed on a computing system display. However, listing of potential meeting times 1200 can take other forms in other embodiments such as, but not limited to: printed forms; displays on a portable computer, a workstation, a two-way pager, a cellular telephone, a smart phone, a digital wireless telephone, a personal digital assistant, a server computer, an Internet appliance, or any other device that includes components capable of processing computer readable data, whether known at the time of filing or as developed later; attachments to e-mails; and/or any other form of text or text display capable of conveying information whether known at the time of filing or as developed later.

In one embodiment, once the user is provided with a listing including at least one potential meeting time when all the user identified mandatory meeting participants and resources are available and a satisfaction score for that potential meeting time is also provided at PROVIDE THE USER A LISTING OF AT LEAST ONE POTENTIAL MEETING TIME ALONG WITH THE SATISFACTION SCORE FOR THE POTENTIAL MEETING TIME OPERATION 1017, process flow proceeds to END OPERATION 1030 and process for relational scheduling of people and resources 1000 is exited.

Using process for relational scheduling of people and resources 1000, the capability to determine meeting times when not only all mandatory meeting participants and resources are available but also meeting times when the importance rating for all non-mandatory participants and resources desired is maximized is provided. As a result, a user of process for relational scheduling of people and resources 1000 is given the capability to determine and schedule the "best" meeting time in terms of both desired participants and resources.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein is merely exemplary, and not mandatory or significant. Consequently, functions performed by a single component may, in some embodiments, be performed by multiple components, and functions performed by multiple components may, in some embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "providing", "obtaining", "requesting", "accessing", "selecting", "listing", "determining", "storing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. are shown in an exemplary order for ease of description and understanding. However, those of skill in the art will readily recognize that numerous different orders of operation could be employed. Consequently, the order of operations shown in the FIGS. is illustrative only and does not limit the invention as claimed below.

In addition, the operations shown in the FIGS. are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for relational scheduling of people and resources comprising:
   one or more processors and
   one or more memories coupled to the one or more processors, the one or more memories having instructions stored therein which when executed by the one or more processors performs a process comprising:
   obtaining meeting participant calendar data comprising the availability of the one or more potential meeting participants;
   obtaining meeting resource data comprising the availability of the one or more meeting resources;
   receiving meeting request data, the meeting request data comprising: meeting scheduling criteria; any mandatory meeting participants; any non-mandatory meeting participants, an importance rating for at least one of any non-mandatory meeting participants, any mandatory meeting resources, any non-mandatory meeting resources, and an importance rating for at least one of any non-mandatory meeting resources;
   analyzing the meeting participant calendar data and the meeting resource data to determine one or more potential meeting times within the meeting scheduling criteria when all mandatory meeting participants and mandatory meeting resources are available by at least analyzing the meeting resource data to determine at least one meeting time within the meeting scheduling criteria when the combined importance ratings of available meeting resources of the one or more desired meeting resources is maximized;
   for each of the one or more potential meeting times, analyzing the meeting participant calendar data and the meeting resource data to determine which meeting participants of the non-mandatory meeting participants and which meeting resources of the non-mandatory meeting resources are also available at the potential meeting time;
   for each of the one or more potential meeting times, calculating the combined importance ratings of the non-mandatory meeting participants and non-mandatory meeting resources that are also available at the potential meeting time; and
   indicating at least one potential meeting time and the combined importance ratings of the non-mandatory meeting participants and non-mandatory meeting resources that are also available at the at least one potential meeting time by at least indicating at least one meeting time within the meeting scheduling criteria when the combined importance ratings of the available meeting resources of the one or more desired meeting resources is maximized.

2. The system for relational scheduling of people and resources of claim 1, wherein;
   obtaining meeting participant calendar data comprising the availability of the one or more potential meeting participants comprises;
   obtaining the meeting participant calendar data from a calendar and/or appointment management system.

3. The system for relational scheduling of people and resources of claim 1, wherein;
   obtaining meeting resource data comprising the availability of the one or more meeting resources comprises:

obtaining data representing at least one conference room and meeting resources fixed in the at least one conference room and the availability of the at least one conference room.

4. The system for relational scheduling of people and resources of claim 1, wherein;
obtaining meeting resource data comprising the availability of the one or more meeting resources comprises:
obtaining data representing at least one portable meeting resource and the availability of the at least one portable meeting resource.

5. The system for relational scheduling of people and resources of claim 1, wherein;
the meeting scheduling criteria comprises a length of the requested meeting, a date window for the requested meeting, and a time of day window for the requested meeting.

6. The system for relational scheduling of people and resources of claim 1, wherein;
the importance ratings for at least one of the non-mandatory meeting participants and at least one the non-mandatory meeting resources is an importance score; further wherein,
for each of the one or more potential meeting times, calculating the combined importance ratings of the non-mandatory meeting participants and non-mandatory meeting resources that are also available at the potential meeting time comprises summing the individual importance scores of each of the non-mandatory meeting participants and each of the non-mandatory meeting resources that are also available at the potential meeting time; and
indicating at least one potential meeting time and the combined importance ratings of the non-mandatory meeting participants and non-mandatory meeting resources that are also available at the potential meeting time comprises indicating at least one potential meeting time and the sum of the individual importance scores of each of the non-mandatory meeting participants and each of the non-mandatory meeting resources that are also available at the potential meeting time.

7. The stem for relational scheduling of people and resources of claim 1, wherein;
indicating at least one potential meeting time and the combined importance ratings of the non-mandatory meeting participants and non-mandatory meeting resources that are also available at the at least one potential meeting time comprises indicating at least one potential meeting time with a combined importance rating of the non-mandatory meeting participants and non-mandatory meeting resources that are also available at the at least one potential meeting time equal to, or greater than a defined threshold value.

* * * * *